United States Patent
Shao et al.

(10) Patent No.: US 11,122,601 B2
(45) Date of Patent: Sep. 14, 2021

(54) BUFFER STATUS REPORT SENDING METHOD, TERMINAL DEVICE, AND NETWORK DEVICE

(71) Applicant: HUAWEI TECHNOLOGIES CO., LTD., Guangdong (CN)

(72) Inventors: Jiafeng Shao, Beijing (CN); Lei Guan, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/577,637

(22) Filed: Sep. 20, 2019

(65) Prior Publication Data

US 2020/0015257 A1 Jan. 9, 2020

Related U.S. Application Data

(63) Continuation of application No. PCT/CN2018/078504, filed on Mar. 9, 2018.

(30) Foreign Application Priority Data

Mar. 21, 2017 (CN) .......................... 201710171002.0

(51) Int. Cl.
*H04W 72/12* (2009.01)
*H04L 27/26* (2006.01)
*H04W 52/34* (2009.01)

(52) U.S. Cl.
CPC ..... *H04W 72/1268* (2013.01); *H04L 27/2607* (2013.01); *H04W 52/346* (2013.01);
(Continued)

(58) Field of Classification Search
CPC ......... H04W 72/1268; H04W 72/1289; H04W 52/346; H04W 72/1242; H04W 72/1284;
(Continued)

(56) References Cited

U.S. PATENT DOCUMENTS 8,300,612 B2 * 10/2012 Choi ................. H04W 72/1278
370/338
2009/0163211 A1 6/2009 Kitazoe et al.
(Continued)

FOREIGN PATENT DOCUMENTS

CN 101018108 A 8/2007
CN 101483927 A 7/2009
(Continued)

OTHER PUBLICATIONS

R2-1701448; ASUSTeK; Discussion on SR and BSR in NR; 3GPP TSG-RAN WG2 Meeting #97; Athens, Greece, Feb. 13-17, 2017; (resubmission of R2-1700354); Agenda Item:10.2.1.4; total 4 pages.

*Primary Examiner* — Brian D Nguyen
(74) *Attorney, Agent, or Firm* — Womble Bond Dickinson (US) LLP

(57) ABSTRACT

Embodiments of this application provide a buffer status report (BSR) sending method, a terminal device, and a network device. The method includes: determining a first resource configured for a first channel; adding, a first cyclic redundancy check (CRC) to a BSR; and sending a second channel on the first resource, or sending the first channel and a second channel on the first resource, where the second channel is used to carry the BSR to which the first CRC is added. Based on the embodiments of this application, the terminal device independently adds the first CRC to the BSR, and sends the second channel carrying the BSR to a network device, so that the network device learns arrival of data corresponding to the second channel at the terminal device. Therefore, the network device can pre-configure a resource for the data, thereby reducing a transmission latency of the data.

12 Claims, 9 Drawing Sheets

(52) U.S. Cl.
CPC ... *H04W 72/1242* (2013.01); *H04W 72/1284* (2013.01); *H04W 72/1289* (2013.01)

(58) Field of Classification Search
CPC ... H04L 1/0061; H04L 1/0072; H04L 1/1854; H04L 27/2607; H04L 1/0078; H04L 1/1887; H04L 1/0042; H04L 5/0053
See application file for complete search history.

(56) References Cited

U.S. PATENT DOCUMENTS

| | | | |
|---|---|---|---|
| 2012/0099452 A1 | 4/2012 | Dai et al. | |
| 2015/0003375 A1 | 1/2015 | Liu et al. | |
| 2015/0334637 A1* | 11/2015 | Kim | H04W 52/365 370/312 |
| 2016/0100407 A1* | 4/2016 | Gaal | H04L 5/001 370/329 |
| 2016/0100430 A1* | 4/2016 | Dabeer | H04W 74/08 370/329 |
| 2016/0323870 A1 | 11/2016 | Wei et al. | |
| 2017/0150512 A1 | 5/2017 | Cao | |
| 2019/0021053 A1* | 1/2019 | Li | H04W 52/0229 |
| 2019/0305918 A1* | 10/2019 | Siomina | H04W 76/36 |
| 2020/0044789 A1* | 2/2020 | Beale | H04L 1/1858 |
| 2020/0187165 A1* | 6/2020 | Park | H04L 1/1812 |

FOREIGN PATENT DOCUMENTS

| | | |
|---|---|---|
| CN | 101904213 A | 12/2010 |
| CN | 101932019 A | 12/2010 |
| CN | 102104961 A | 6/2011 |
| CN | 102571266 A | 7/2012 |
| CN | 103260250 A | 8/2013 |
| CN | 104106299 A | 10/2014 |
| CN | 104754763 A | 7/2015 |
| WO | 2016019580 A1 | 2/2016 |

* cited by examiner

BUFFER STATUS REPORT SENDING METHOD, TERMINAL DEVICE, AND NETWORK DEVICE

CROSS-REFERENCE TO RELATED APPLICATIONS

This application is a continuation of International Application No. PCT/CN2018/078504, filed on Mar. 9, 2018, which claims priority to Chinese Patent Application No. 201710171002.0, filed on Mar. 21, 2017. The disclosures of the aforementioned applications are hereby incorporated by reference in their entireties.

TECHNICAL FIELD

This application relates to the communications field, and more specifically, to a buffer status report sending method, a terminal device, and a network device.

BACKGROUND

In a long term evolution (LTE)—A system, if a terminal device receives a second uplink service before transmitting a first uplink service, the terminal device may update a buffer status report (BSR) carried on a data channel of the first uplink service, where the BSR is used to inform a network device that the terminal device still has a service that needs to be sent.

The BSR and data are encoded together. Therefore, the network device can learn application of the second uplink service only after successfully demodulating the first uplink service. As a result, a transmission latency of the second uplink service is affected by whether the first uplink service is successfully demodulated. In addition, if the network device incorrectly demodulates the first uplink service, the first uplink service needs to be retransmitted. Therefore, before the second uplink service can be transferred, the second uplink service needs to wait until the first uplink service is retransmitted and successfully demodulated. As a result, the transmission latency of the second uplink service is relatively high. Therefore, it is quite difficult to use a conventional solution to satisfy a service that requires a relatively low transmission latency.

SUMMARY

This application provides a buffer status report sending method, a terminal device, and a network device, to reduce a data transmission latency.

According to a first aspect, a buffer status report sending method is provided. The method includes: determining, by a terminal device, a first resource, where the first resource is a resource configured for a first channel, and the first channel is a data channel; adding, by the terminal device, a first cyclic redundancy check (CRC) to a buffer status report; and sending, by the terminal device, a second channel on the first resource, or sending, by the terminal device, the first channel and a second channel on the first resource, where the second channel is used to carry the buffer status report to which the first CRC is added.

The terminal device determines the first resource configured for the first channel, and adds the first CRC to the buffer status report, where the buffer status report to which the first CRC is added is carried on the second channel; and then sends the second channel on the first resource, or sends the first channel and the second channel on the first resource. In this way, the terminal device independently adds the first CRC to the buffer status report, and sends the second channel carrying the buffer status report to a network device, so that the network device learns, through the second channel, arrival of data corresponding to the second channel at the terminal device, and can learn, independent of successfully demodulating the first channel, the data corresponding to the buffer status report carried on the second channel. Therefore, the network device can pre-configure a resource for the data, thereby reducing a transmission latency of the data.

The buffer status report may be a BSR in LTE, may be a buffer status report corresponding to one or more hybrid automatic retransmission request (HARQ) processes, or may be a buffer status report of a terminal device in a new radio access system.

In some possible embodiments, the terminal device adds the first CRC to the buffer status report.

Assuming that the buffer status report includes B bits, the first CRC includes D bits, and the terminal device adds the first CRC to the buffer status report, a size of a transport block to which the first CRC is added is B+D bits. Then, the terminal device may perform one or a combination of more than one of: code block segmentation, code block CRC addition, channel coding, rate matching, code block concatenation, channel interleaving, and the like on the transport block.

In some possible embodiments, the sending, by the terminal device, the second channel on the first resource may be sending the second channel and skipping sending the first channel.

In some possible embodiments, before the sending, by the terminal device, the first channel and the second channel on the first resource, the method further includes: adding, by the terminal device, a second CRC to a first transport block.

The terminal device adds the second CRC to the first transport block, and adds the first CRC to the buffer status report carried on the second channel, so that the network device demodulates the second channel independent of whether the first channel is successfully demodulated. It should be understood that the network device demodulates the second channel without being affected by the first channel, so that the network device can pre-learn arrival of data corresponding to the buffer status report, and then configure a resource for the data, thereby reducing a transmission latency of the data.

In some possible embodiments, after the adding, by the terminal device, a second CRC to a first transport block, the method further includes: dividing, by the terminal device, the first transport block to which the second CRC is added into at least two code blocks; and adding, by the terminal device, a third CRC to each of the at least two code blocks.

After adding the second CRC to the first transport block, the terminal device may further perform code block segmentation on the first transport block to which the second CRC is added. When a size of the first transport block is less than or equal to an encoding threshold of an encoder, and one code block is obtained through code block segmentation, the third CRC is not added, or a length of the added third CRC is 0; or when a size of the first transport block is greater than the encoding threshold of the encoder, because the first transport block is relatively large, the first transport block to which the second CRC is added may be divided, to obtain at least two code blocks, and the third CRC is added to each of the at least two code blocks. Therefore, the network device determines a specific erroneous code block, and then adjusts a retransmission manner for the first transport block, thereby reducing a transmission latency of the first transport block. The encoding threshold of the encoder may be notified by the network device by using higher layer signaling or may be pre-defined.

In some possible embodiments, the sending, by the terminal device, the first channel and the second channel on the first resource includes: sending, by the terminal device, the first channel and the second channel on the first resource, where a sum of a transmit power of the first channel and a transmit power of the second channel is less than or equal to a first preset power threshold.

If the sum of the transmit power of the first channel and the transmit power of the second channel is less than or equal to the first preset power threshold, the terminal device sends the first channel and the second channel on the first resource; or if the sum of the transmit power of the first channel and the transmit power of the second channel is greater than the first preset power threshold, the terminal device sends the first channel or the second channel on the first resource, thereby preventing a transmit power of the terminal device from exceeding an allowed maximum transmit power or exceeding a configured transmit power, and reducing transmission accuracy of the first channel and the second channel. Therefore, this embodiment of this application can improve transmission efficiency of the terminal device.

The transmit power of the first channel and the transmit power of the second channel may be transmit powers determined based on a path loss, a transmit power control command, and the like. It may be understood that the transmit power of the first channel and the transmit power of the second channel are transmit powers that are not subject to a power compression process.

In some possible embodiments, the first resource includes a plurality of resource elements, and the sending, by the terminal device, the first channel and the second channel on the first resource includes: sending, by the terminal device, the first channel on some of the plurality of resource elements, and sending, by the terminal device, the second channel on some other resource elements of the plurality of resource elements.

The first resource includes at least one uplink reference signal. To be specific, the first channel and/or the second channel includes the at least one uplink reference signal. The at least one uplink reference signal further occupies some resource elements, at least one of the at least one uplink reference signal is used to demodulate the first channel, and at least one of the at least one uplink reference signal is used to demodulate the second channel. It should be noted that the uplink reference signal used to demodulate the first channel may be the same as or different from the uplink reference signal used to demodulate the second channel.

The some other resource elements of the plurality of resource elements may be all resource elements other than the some of the plurality of resource elements occupied by the first channel, or may be some resource elements other than the some of the plurality of resource elements occupied by the first channel.

In some possible embodiments, the resource elements for sending the second channel are some or all resource elements in the first resource excluding the at least one uplink reference signal.

The at least one uplink reference signal includes at least one of a first uplink reference signal, a second uplink reference signal, and a third uplink reference signal. One uplink reference signal may occupy all resource elements on one or more symbols in the first resource, or may occupy some resource elements on one or more symbols in the first resource.

In some possible embodiments, for the some other resource elements of the plurality of resource elements occupied by the second channel, at least one of the following rules may be followed:

Rule 1: The resource elements for sending the second channel are some resource elements in the first resource excluding the resource elements occupied by the at least one uplink reference signal, and are mapped starting from a maximum resource frequency domain unit index of the first resource.

Rule 2: The resource elements for sending the second channel are some resource elements in the first resource excluding the resource elements occupied by the at least one uplink reference signal, and are mapped starting from a minimum resource frequency domain unit index of the first resource.

Rule 3: The resource elements for sending the second channel are some resource elements in the first resource excluding the at least one uplink reference signal, and are mapped to resource elements close to the resource elements occupied by the at least one uplink reference signal.

The resource element may be a resource element in time domain and/or frequency domain. The terminal device first maps the first channel to the plurality of resource elements, and then maps the second channel to some other resource elements of the plurality of resource elements. The terminal device divides the plurality of resource elements of the first resource through puncturing or rate matching, so that the network device can accurately demodulate the first channel and the second channel.

In some possible embodiments, when both the first channel and the second channel of the terminal device are transmitted on the first resource, if a quantity of resource elements occupied by the first channel is greater than or equal to a first resource element quantity threshold, or a ratio of a quantity of resource elements occupied by the first channel to a quantity of the plurality of resource elements is greater than or equal to a first resource element proportion threshold, or the transmit power of the first channel is greater than or equal to a second preset power threshold, the terminal device sends both the first channel and the second channel on the first resource.

In some possible embodiments, when both the first channel and the second channel of the terminal device are transmitted on the first resource, if a quantity of resource elements occupied by the second channel is less than or equal to a second resource element quantity threshold, or a ratio of a quantity of resource elements occupied by the second channel to a quantity of the plurality of resource elements is less than or equal to a second resource element proportion threshold, or the transmit power of the second channel is less than or equal to a third preset power threshold, the terminal device sends both the first channel and the second channel on the second resource.

In some possible embodiments, when both the first channel and the second channel of the terminal device are transmitted on the first resource, if a quantity of resource elements occupied by the first channel is less than or equal to a third resource element quantity threshold, or a ratio of a quantity of resource elements occupied by the first channel to a quantity of the plurality of resource elements is less than or equal to a third resource element proportion threshold, or the transmit power of the first channel is less than or equal to a fourth preset power threshold, the terminal device sends the second channel on the first resource and does not send the first channel.

In some possible embodiments, when both the first channel and the second channel of the terminal device are transmitted on the first resource, if a quantity of resource elements occupied by the second channel is greater than or equal to a fourth resource element quantity threshold, or a ratio of a quantity of resource elements occupied by the second channel to a quantity of the plurality of resource elements is greater than or equal to a fourth resource element proportion threshold, or the transmit power of the second channel is greater than or equal to a fifth preset power threshold, the terminal device sends the second channel on the first resource and does not send the first channel.

If the second channel occupies an excessively large quantity of resource elements, a base station cannot identify whether the terminal device sends the first channel. Therefore, to prevent subsequent resending of the first channel from being affected, the terminal device may send only the second channel.

In some possible embodiments, the sending, by the terminal device, a second channel on the first resource includes: sending, by the terminal device, the second channel on the first resource, where a priority of the first channel is lower than or equal to a priority of the second channel.

The sending, by the terminal device, a second channel on the first resource includes: sending, by the terminal device, the second channel on the first resource and skipping sending the first channel, where a priority of the first channel is lower than or equal to a priority of the second channel.

The terminal device may determine, based on the priority of the first channel and the priority of the second channel, to send the first channel or the second channel on the first resource. When the priority of the second channel is higher than the priority of the first channel, the terminal device sends the second channel, thereby reducing a transmission latency of the data corresponding to the buffer status report carried on the second channel.

In some possible embodiments, the method further includes: receiving, by the terminal device, first scheduling information or first indication information, where the first scheduling information indicates the first resource; and the determining, by a terminal device, a first resource includes: determining, by the terminal device, the first resource based on the first scheduling information.

The first resource is determined based on the first scheduling information or the first indication information carried on a physical layer channel.

The terminal device may determine the first resource based on the first scheduling information, and send the second channel on the first resource, or send the first channel and the second channel on the first resource, thereby reducing a transmission latency of the data corresponding to the buffer status report carried on the second channel.

In some possible embodiments, the method further includes: receiving, by the terminal device, higher layer signaling, where the higher layer signaling includes the first resource; and the determining, by a terminal device, a first resource includes: determining, by the terminal device, the first resource based on the higher layer signaling.

The terminal device may determine the first resource based on the higher layer signaling, and send the second channel on the first resource, or send the first channel and the second channel on the first resource, where the first resource is a resource for grant free transmission, thereby reducing a transmission latency of the data corresponding to the buffer status report carried on the second channel.

In some possible embodiments, the method further includes: determining, by the terminal device, the first resource based on a pre-defined rule.

The terminal device may perform sending based on a resource pre-defined, and does not need to receive configuration information, thereby reducing a transmission latency of the data corresponding to the buffer status report carried on the second channel.

It should be understood that the first resource is a resource configured for the first channel, and may be pre-defined, determined based on the higher layer signaling, or determined based on the first scheduling information or the first indication information in physical layer signaling.

In some possible embodiments, the first transport block carried on the first channel corresponds to a first hybrid automatic repeat request HARQ process, and the buffer status report carried on the second channel includes at least a buffer status report of a second HARQ process.

In addition to the buffer status report of data corresponding to the second HARQ process, the buffer status report carried on the second channel may further include buffer status reports of a plurality of other HARQ processes.

In some possible embodiments, the first transport block carried on the first channel may include a first logical channel group, and the buffer status report carried on the second channel includes at least a buffer status report of a second logical channel group.

In some possible implementations, the first transport block carried on the first channel may include a first service, and the buffer status report carried on the second channel includes at least a buffer status report of a second service.

A service may be a service type such as an ultra-reliable and low latency communications (URLLC) service or an enhanced mobile broadband (eMBB) service. A service may alternatively be a service requirement such as a URLLC service required by the first service or a URLLC service required by the second service.

In some possible embodiments, the terminal device sends first notification information to the network device, to notify the network device that the terminal device is capable of sending both the first channel and the second channel.

The terminal device sends, to the network device, the first notification information, to notify the network device that the terminal device is capable of sending both the first channel and the second channel. In this way, when learning that the terminal device supports sending both the first channel and the second channel, the network device may choose to send, to the terminal device, first configuration information for configuring that both the first channel and the second channel are sent or to send, to the terminal device, second configuration information for configuring that both the first channel and the second channel are not sent, so that the network device controls a sending manner of the terminal device more flexibly.

In some possible embodiments, before the sending, by the terminal device, the first channel and the second channel on the first resource, the method further includes: receiving, by the terminal device, first configuration information, where the first configuration information is used to configure that the terminal device can send both the first channel and the second channel.

The terminal device may receive the first configuration information sent by the network device based on the received first notification information, and determine, based on the first configuration information, that the terminal device can send both the first channel and the second channel. In this way, the network device can accurately receive the first channel and the second channel that are sent by the terminal device, thereby improving signal transmission efficiency.

In some possible implementations, the terminal device sends second notification information to the network device, to notify the network device that the terminal device is incapable of sending both the first channel and the second channel.

In some possible embodiments, before the sending, by the terminal device, the first channel or the second channel on the first resource, the method further includes: receiving, by the terminal device, second configuration information, where the second configuration information is used to configure that the terminal device cannot send both the first channel and the second channel.

The terminal device may receive the second configuration information sent by the network device based on the received second notification information, and determine, based on the second configuration information, that the terminal device cannot send both the first channel and the second channel. It should be understood that, when the first channel and the second channel of the terminal device are transmitted on a same resource, the terminal device can send only the first channel or the second channel. In this way, the network device can accurately receive the first channel or the second channel that are sent by the terminal device, thereby improving signal transmission efficiency.

In some possible embodiments, before the sending, by the terminal device, the first channel or the second channel on the first resource, the method further includes: receiving, by the terminal device, second configuration information, where the second configuration information is used to configure that the terminal device cannot send both the first channel and the second channel.

In some possible embodiments, the sending, by the terminal device, the first channel on the first resource further includes: sending, by the terminal device, a first uplink reference signal on the first resource.

The terminal device may send the first channel including the first uplink reference signal, or may separately send the first channel and the first uplink reference signal, so that the network device detects, based on the first uplink reference signal, that the terminal device sends the first channel and does not send the second channel.

In some possible embodiments, the sending, by the terminal device, the second channel on the first resource further includes: sending, by the terminal device, a second uplink reference signal on the first resource.

The terminal device may send the second channel including the second uplink reference signal, or may separately send the second channel and the second uplink reference signal, so that the network device detects, based on the second uplink reference signal, that the terminal device sends the second channel and does not send the first channel.

In some possible embodiments, the sending, by the terminal device, the first channel and the second channel on the first resource further includes: sending, by the terminal device, a third uplink reference signal on the first resource.

The terminal device may send the first channel and the second channel including the third uplink reference signal, or may separately send the first channel, the second channel, and the third uplink reference signal, so that the network device detects, based on the third uplink reference signal, that the terminal device sends the first channel and the second channel.

The first uplink reference signal, the second uplink reference signal, and the third uplink reference signal are different from each other. An uplink reference signal may be a demodulation reference signal (DMRS) used to demodulate an uplink channel, may be a sounding reference signal (SRS) used to measure an uplink channel, may be a preamble sequence Preamble, or the like. A DMRS used for uplink control channel demodulation is referred to as an uplink control channel DMRS, and a DMRS used for uplink data channel demodulation is referred to as an uplink data channel DMRS. That the uplink reference signals are different from each other may be at least one of the following: sequence cyclic shifts corresponding to the uplink reference signals are different, layer index values corresponding to the uplink reference signals are different, frequency domain locations corresponding to the uplink reference signals are different, and time domain locations corresponding to the uplink reference signals are different.

After receiving the second notification information, the network device may send the second configuration information to the terminal device, and the terminal device determines, based on the second configuration information, that the terminal device cannot send both the first channel and the second channel. It should be understood that, when the first channel and the second channel of the terminal device are transmitted on a same resource, the terminal device can send only the first channel or the second channel. In this way, the network device can accurately receive the first channel or the second channel that are sent by the terminal device, thereby improving signal transmission efficiency.

According to a second aspect, a buffer status report receiving method is provided. The method includes: determining, by a network device, a first resource, where the first resource is a resource configured for a first channel, and the first channel is a data channel; and receiving, by the network device, a second channel on the first resource, where the second channel is used to carry a buffer status report to which a first cyclic redundancy check CRC is added.

It should be understood that the first resource is a resource configured for the first channel, and may be pre-defined, determined based on the higher layer signaling, or determined based on the first scheduling information or the first indication information in physical layer signaling. The step of determining, by a network device, a first resource is optional. When the first resource is pre-defined, the network device does not need to determine the first resource, and directly receives the second channel on the first resource.

The network device receives the second channel on the first resource, where the first resource is a resource configured for the first channel, the second channel is used to carry the buffer status report to which the first CRC is added, the buffer status report to which the first CRC is added is obtained by adding, by a terminal device, the first CRC to the buffer status report; and receives the first channel and the second channel on the first resource or receives the second channel on the first resource. In this way, the network device receives the buffer status report carried on the second channel, and the network device learns, through the second channel, arrival of data corresponding to the second channel at the terminal device, and can learn, independent of successfully demodulating the first channel, the data corresponding to the buffer status report carried on the second channel, so that the network device can pre-configure a resource for the data, thereby reducing a transmission latency of the data.

In some possible embodiments, the receiving, by the network device, a second channel on the first resource includes: determining, by the network device based on the first CRC, whether the second channel is correctly received.

The network device compares the first CRC with a first CRC pre-stored in the terminal device on the network device side. If matching, it is considered that the second channel is correctly received; or if mismatching, it is considered that the second channel is incorrectly received. The network device may determine, based on the first CRC, whether the second channel is correctly received. If the second channel is incorrectly received, the network device may instruct the terminal device to retransmit the second channel or retransmit the buffer status report, thereby preventing the network device from incorrectly receiving the second channel, so as to improve data receiving reliability.

In some possible embodiments, the receiving, by the network device, a second channel on the first resource includes: determining, by the network device based on the first CRC, a terminal device corresponding to the second channel.

The network device compares the first CRC with CRCs pre-stored terminal devices on the network device side. If the first CRC matches a first CRC, it is considered that the second channel is sent by a first terminal device. If the first CRC matches a fourth CRC, it is considered that the second channel is sent by a second terminal device. The rest can be deduced by analogy, and details are not described. The network device determines, based on the first CRC, a terminal device that sends the second channel, thereby correctly and quickly identifying the terminal device, so that the network device demodulates the second channel without being affected by the first channel, and therefore can pre-learn arrival of data corresponding to a buffer status report of the corresponding terminal device, and then configure a resource for the data, thereby reducing a transmission latency of the data of the corresponding terminal device.

In some possible embodiments, the receiving, by the network device, a second channel on the first resource includes: receiving, by the network device, the first channel and the second channel on the first resource, where the first channel carries a first transport block to which a second CRC is added.

The network device receives, on the first resource, the first transport block to which the second CRC is added and that is carried on the first channel, and the buffer status report to which the first CRC is added and that is carried on the second channel. In this way, the buffer status report on the second channel is demodulated independent of whether the first channel is successfully demodulated. It should be understood that the network device demodulates the second channel without being affected by the first channel, and therefore can pre-learn arrival of data corresponding to the buffer status report, and then configure a resource for the data, thereby reducing a transmission latency of the data.

In some possible embodiments, the receiving, by the network device, the first channel and the second channel on the first resource, where the first channel carries a transport block to which a second CRC is added includes: receiving, by the network device, the first channel and the second channel on the first resource, where the first transport block to which the second CRC is added includes at least two code blocks, and a third CRC is added to each of the at least two code blocks.

The network device receives the first channel and the second channel on the first resource, the first channel carries the first transport block to which the second CRC is added, and the first transport block to which the second CRC is added includes the at least two code blocks. In addition, the third CRC is added to each of the at least two code blocks. In this way, the network device demodulates the buffer status report on the second channel independent of whether the first channel is successfully demodulated. It should be understood that the network device demodulates the second channel without being affected by the first channel, and therefore can pre-learn arrival of data corresponding to the buffer status report, and then configure a resource for the data, thereby reducing a transmission latency of the data.

In some possible embodiments, the receiving, by the network device, the first channel and the second channel on the first resource includes: determining, by the network device based on the second CRC, whether the first channel is correctly received.

The network device compares the second CRC with a second CRC pre-stored in the terminal device on the network device side. If matching, it is considered that the first channel is correctly received; or if mismatching, it is considered that the first channel is incorrectly received. The network device may determine, based on the second CRC, whether the first channel is correctly received. If the first channel is incorrectly received, the network device may instruct the terminal device to retransmit the first channel or retransmit the buffer status report, thereby preventing the network device from incorrectly receiving the first channel, so as to improve data receiving reliability.

In some possible embodiments, the receiving, by the network device, a second channel on the first resource includes: determining, by the network device based on the second CRC, a terminal device corresponding to the first channel.

The network device compares the second CRC with CRCs pre-stored terminal devices on the network device side. If the second CRC matches a second CRC, it is considered that the first channel is sent by a first terminal device. If the second CRC matches a fifth CRC, it is considered that the first channel is sent by a second terminal device. The rest can be deduced by analogy, and details are not described. The network device determines, based on the second CRC, a terminal device that sends the second channel, thereby correctly and quickly identifying the terminal device, so that the network device demodulates the second channel without being affected by the first channel, and therefore can pre-learn arrival of data corresponding to a buffer status report of the corresponding terminal device, and then configure a resource for the data, thereby reducing a transmission latency of the data of the corresponding terminal device.

In some possible embodiments, the first resource includes a plurality of resource elements, and before the receiving, by the network device, a second channel on the first resource, the method includes at least one of the following detection methods: detecting, by the network device, the first channel on some of the plurality of resource elements; detecting, by the network device, the second channel on some other resource elements of the plurality of resource elements; and detecting, by the network device, the second channel on all of the plurality of resource elements.

The first resource includes at least one uplink reference signal. To be specific, the first channel and/or the second channel includes the at least one uplink reference signal. The at least one uplink reference signal further occupies some resource elements, at least one of the at least one uplink reference signal is used to demodulate the first channel, and at least one of the at least one uplink reference signal is used to demodulate the second channel. It should be noted that the reference signal used to demodulate the first channel may be the same as or different from the reference signal used to demodulate the second channel.

The some other resource elements of the plurality of resource elements may be all resource elements other than the some of the plurality of resource elements occupied by the first channel, or may be some resource elements other than the some of the plurality of resource elements occupied by the first channel.

In some possible embodiments, the resource elements for detecting the second channel are some or all resource elements in the first resource excluding the at least one uplink reference signal.

The at least one uplink reference signal includes at least one of a first uplink reference signal, a second uplink reference signal, and a third uplink reference signal. One uplink reference signal may occupy all resource elements on one or more symbols in the first resource, or may occupy some resource elements on one or more symbols in the first resource.

In some possible implementations, for the some other resource elements of the plurality of resource elements occupied by the second channel, at least one of the following rules may be followed:

Rule 1: The resource elements for detecting the second channel are some resource elements in the first resource excluding the resource elements occupied by the at least one uplink reference signal, and are mapped starting from a maximum resource frequency domain unit index of the first resource.

Rule 2: The resource elements for detecting the second channel are some resource elements in the first resource excluding the resource elements occupied by the at least one uplink reference signal, and are mapped starting from a minimum resource frequency domain unit index of the first resource.

Rule 3: The resource elements for detecting the second channel are some resource elements in the first resource excluding the at least one uplink reference signal, and are mapped to resource elements close to the resource elements occupied by the at least one uplink reference signal.

When detecting the second channel, the network device can receive the second channel or receive the first channel and the second channel, so that the network device can pre-configure a resource for data corresponding to the second channel, thereby reducing a transmission latency of the data.

In some possible embodiments, the first resource includes a plurality of resource elements, and the receiving, by the network device, the first channel and the second channel on the first resource includes: receiving, by the network device, the first channel on some of the plurality of resource elements, and receiving the second channel on some other resource elements of the plurality of resource elements.

The network device separately receives the first channel and the second channel on resource elements obtained after the terminal device divides a plurality of resource elements of a first time domain resource through puncturing or rate matching, thereby accurately demodulating the first channel and the second channel.

In some possible embodiments, the receiving, by the network device, a second channel on the first resource further includes: receiving, by the network device, a second uplink reference signal on the first resource.

The network device may receive the second channel including the second uplink reference signal, or may separately receive the second channel and the second uplink reference signal, so that the network device detects the terminal device based on the second uplink reference signal and detects that the terminal device sends the second channel and does not send the first channel.

In some possible embodiments, the receiving, by the network device, the first channel and the second channel on the first resource further includes: receiving, by the network device, a third uplink reference signal on the first resource.

The network device may receive the first channel and the second channel including the third uplink reference signal, or may separately receive the first channel, the second channel, and the second uplink reference signal, so that the network device detects the terminal device based on the third uplink reference signal and detects that the terminal device sends the first channel and the second channel.

In some possible embodiments, the receiving, by the network device, the first channel on the first resource further includes: receiving, by the network device, a first uplink reference signal on the first resource.

The network device may receive the first channel including the first uplink reference signal, or may separately receive the first channel and the first uplink reference signal, so that the network device detects the terminal device based on the first uplink reference signal and detects that the terminal device sends the first channel and does not send the second channel.

The first uplink reference signal, the second uplink reference signal, and the third uplink reference signal are different from each other. An uplink reference signal may be a demodulation reference signal (DMRS) used to demodulate an uplink channel, may be a sounding reference signal (SRS) used to measure an uplink channel, may be a preamble sequence Preamble, or the like. A DMRS used for uplink control channel demodulation is referred to as an uplink control channel DMRS, and a DMRS used for uplink data channel demodulation is referred to as an uplink data channel DMRS. That the uplink reference signals are different from each other may be at least one of the following: sequence cyclic shifts corresponding to the uplink reference signals are different, layer index values corresponding to the uplink reference signals are different, frequency domain locations corresponding to the uplink reference signals are different, and time domain locations corresponding to the uplink reference signals are different.

In some possible embodiments, before the receiving, by the network device, a second channel on the first resource, the method further includes: sending, by the network device, first scheduling information, where the first scheduling information indicates the first resource.

The network device may indicate the first resource by using the first scheduling information, and receive the second channel by using the first resource, where the first resource is a resource that may be used for grant based transmission, thereby reducing the transmission latency of the data corresponding to the second channel.

In some possible embodiments, before the receiving, by the network device, a second channel on the first resource, the method further includes: sending, by the network device, higher layer signaling, where the higher layer signaling includes the first resource.

The network device may add the first resource to the higher layer signaling, and receive the second channel on the first resource, where the first resource is a resource for grant free transmission, thereby reducing the transmission latency of the data corresponding to the second channel.

In some possible embodiments, before the receiving, by the network device, a second channel on the first resource, the method further includes: pre-defining the first resource.

The first resource is a pre-defined resource, the network device does not need to send signaling, and the network device and the terminal device may specify the first resource through pre-definition, thereby reducing the transmission latency of the data corresponding to the second channel.

According to a third aspect, a terminal device is provided. The terminal device includes a module configured to perform the method according to the first aspect or any possible implementation of the first aspect.

According to a fourth aspect, a network device is provided. The terminal device includes a module configured to perform the method according to the second aspect or any possible implementation of the second aspect.

According to a fifth aspect, a system is provided. The system includes:

the terminal device according to the third aspect and the network device according to the fourth aspect.

According to a sixth aspect, a terminal device is provided. The terminal device includes: a processor, a memory, and a communications interface. The processor is connected to the memory and the communications interface. The memory is configured to store an instruction; the processor is configured to execute the instruction; and the communications interface is configured to communicate with another network element under control of the processor. When the processor executes the instruction stored in the memory, the execution enables the processor to perform the method according to the first aspect or any possible implementation of the first aspect.

According to a seventh aspect, a network device is provided. The network device includes: a processor, a memory, and a communications interface. The processor is connected to the memory and the communications interface. The memory is configured to store an instruction; the processor is configured to execute the instruction; and the communications interface is configured to communicate with another network element under control of the processor. When the processor executes the instruction stored in the memory, the execution enables the processor to perform the method according to the second aspect or any possible implementation of the second aspect.

According to an eighth aspect, a computer storage medium is provided. The computer storage medium stores program code, and the program code is used to indicate an instruction for performing the buffer status report sending method according to the first aspect or any possible implementation of the first aspect.

According to a ninth aspect, a computer storage medium is provided. The computer storage medium stores program code, and the program code is used to indicate an instruction for performing the buffer status report sending method according to the second aspect or any possible implementation of the second aspect.

According to a tenth aspect, a signal transmission method is provided. The method includes: sending, by a terminal device, first request information on a first time domain resource; sending, by the terminal device, a first transport block on at least one second time domain resource, where the at least one second time domain resource is within a first time period, the first time period is a time period from an end moment of the first time domain resource to a start moment of an $i^{th}$ time domain resource before a third time domain resource, the third time domain resource is determined based on first scheduling information, the first scheduling information is scheduling information that is of the first transport block and that is received by the terminal device after the first request information is sent, the first time period corresponds to a first HARQ process, and i is an integer greater than or equal to 0; and sending, by the terminal device, the first transport block on the third time domain resource.

The terminal device sends the first request information on the first time domain resource, and sends the first transport block on the at least one second time domain resource, where the at least one second time domain resource is within the first time period, the first time period is the time period from the end moment of the first time domain resource to the start moment of the $i^{th}$ time domain resource before the third time domain resource, the third time domain resource is determined based on the first scheduling information, the first scheduling information is the scheduling information that is of the first transport block and that is received by the terminal device after the first request information is sent, and the first time period corresponds to the first HARQ process; and the terminal device sends the first transport block on the third time domain resource. By determining that the first time period corresponds to the first HARQ process, the terminal device can send the first transport block of the same process on both the second time domain resource for grant free transmission and the third time domain resource for grant based transmission, so that the network device performs combined receiving, thereby improving accuracy of receiving the first transport block.

In one embodiment, the first request information is used to request a time domain resource for sending the first transport block.

In one embodiment, the second time domain resource may be pre-defined or may be configured for higher layer signaling or physical layer signaling, and is a time domain resource for grant free transmission. The third time domain resource is a time domain resource for grant based transmission.

In some possible embodiments, the terminal device sends second request information on a fourth time domain resource, where the fourth time domain resource is later than the first time domain resource in time; the terminal device sends a second transport block on at least one fifth time domain resource, where the second transport block corresponds to a second HARQ process, the second HARQ process is different from the first HARQ process, the at least one fifth time domain resource is within a second time period, the second time period is a time period from the start moment of the $i^{th}$ time domain resource before the third time domain resource to a start moment of a $j^{th}$ time domain resource before a sixth time domain resource, the sixth time domain resource is determined based on second scheduling information, the second scheduling information is scheduling information that is of the second transport block and that is received by the terminal device after the first scheduling information is received, the second time period corresponds to the second HARQ process, and j is an integer greater than or equal to 0; and the terminal device sends the second transport block on the sixth time domain resource.

In one embodiment, the second request information is used to request a time domain resource for sending the second transport block.

In one embodiment, the fifth time domain resource may be pre-defined or may be configured for higher layer signaling or physical layer signaling, and is a time domain resource for grant free transmission. The sixth time domain resource is a time domain resource for grant based transmission.

In one embodiment, the first scheduling information may alternatively be control information, including some scheduling or control information such as a precoding matrix indicator (PMI), resource block assignment (RBA), and a modulation and coding scheme (MCS).

In one embodiment, the second scheduling information may alternatively be control information, including some scheduling or control information such as a precoding matrix indicator (PMI), resource block assignment (RBA), and a modulation and coding scheme (MCS).

In one embodiment, i and j may be notified by the network device by using the higher layer signaling, or i and j may be preset. For example, i=1, and j=1. i may be the same as or different from j.

In some possible embodiments, the first HARQ process and the second HARQ process are consecutive HARQ processes. For example, a process number of the first HARQ process is 0, and then a process number of the second HARQ process is 1.

In some possible embodiments, the third time domain resource is determined based on the first scheduling information; and the method further includes: receiving, by the terminal device, the first scheduling information, and determining the third time domain resource based on the first scheduling information.

In some possible embodiments, the terminal device determines the third time domain resource based on the first scheduling information; and the method further includes: determining, by the terminal device, the third time domain resource based on a receiving time of the first scheduling information and time indication information in the first scheduling information.

In some possible embodiments, the terminal device determines the third time domain resource based on the first scheduling information; and the method further includes: determining, by the terminal device, the third time domain resource based on a receiving time of the first scheduling information and scheduling and uplink transmission time interval information configured for the higher layer signaling.

In some possible embodiments, the terminal device determines the third time domain resource based on the first scheduling information; and the method further includes: determining, by the terminal device, the third time domain resource based on a receiving time of the first scheduling information and pre-defined scheduling and uplink transmission time interval information.

In one embodiment, the pre-defined scheduling and uplink transmission time interval information may be h time domain resources, where h is an integer greater than or equal to 0.

In some possible embodiments, the sixth time domain resource is determined based on the second scheduling information; and the method further includes: receiving, by the terminal device, the second scheduling information, and determining, by the terminal device, the sixth time domain resource based on the second scheduling information.

In some possible embodiments, the terminal device determines the sixth time domain resource based on the second scheduling information; and the method further includes: determining, by the terminal device, the sixth time domain resource based on a receiving time of the second scheduling information and time indication information in the second scheduling information.

In some possible embodiments, the terminal device determines the sixth time domain resource based on the second scheduling information; and the method further includes: determining, by the terminal device, the sixth time domain resource based on a receiving time of the first scheduling information and scheduling and uplink transmission time interval information configured for the higher layer signaling.

In some possible embodiments, the terminal device determines the sixth time domain resource based on the second scheduling information; and the method further includes: determining, by the terminal device, the sixth time domain resource based on a receiving time of the second scheduling information and pre-defined scheduling and uplink transmission time interval information.

In one embodiment, the pre-defined scheduling and uplink transmission time interval information may be u time domain resources, where u is an integer greater than or equal to 0. u may be the same as or different from h.

In some possible embodiments, after the sending, by the terminal device, the second request information on the first time domain resource, the method further includes: determining, by the terminal device based on a quantity N of HARQ processes of the terminal device, a quantity N of scheduling requests that can be sent by the terminal device within a time period from the first time domain resource to the third time domain resource, where N is greater than or equal to 2, and N is a positive integer.

The terminal device determines, based on the quantity N of HARQ processes of the terminal device, the quantity N of scheduling requests that can be sent by the terminal device within the time period from the first time domain resource to the third time domain resource, thereby transmitting transport blocks of the N processes.

In some possible embodiments, after the sending, by the terminal device, the second request information on the fourth time domain resource, the method further includes: sending, by the terminal device, third request information on a seventh time domain resource; and sending, by the terminal device, a third transport block on at least one eighth time domain resource, where the third transport block corresponds to a third HARQ process, the at least one eighth time domain resource is within a third time period, the third time period is a time period from an end moment of the $j^{th}$ time domain resource before the sixth time domain resource to a start moment of a $k^{th}$ time domain resource before a ninth time domain resource, the ninth time domain resource is determined based on third scheduling information, the third scheduling information is scheduling information that is of the third transport block and that is received by the terminal device after the second scheduling information is received, the third time period corresponds to the third HARQ process, and k is an integer greater than or equal to 0.

In one embodiment, the third request information is used to request a time domain resource for sending the third transport block.

In one embodiment, the third time period may be a time period from the end moment of the $j^{th}$ time domain resource before the sixth time domain resource to an end moment of the $k^{th}$ time domain resource before the ninth time domain resource, may be a time period from the start moment of the $j^{th}$ time domain resource before the sixth time domain resource to the end moment of the $k^{th}$ time domain resource before the ninth time domain resource, or may be a time period from the start moment of the $j^{th}$ time domain resource before the sixth time domain resource to the start moment of the $k^{th}$ time domain resource before the ninth time domain resource.

In one embodiment, the eighth time domain resource may be pre-defined or may be configured for higher layer signaling or physical layer signaling, and is a time domain resource for grant free transmission. The ninth time domain resource is a time domain resource for grant based transmission.

In one embodiment, k may be notified by the network device by using the higher layer signaling, or k may be preset. For example, k=1.

In one embodiment, the third scheduling information may alternatively be control information, including some scheduling or control information such as a precoding matrix indicator (PMI), resource block assignment (RBA), and a modulation and coding scheme (MCS).

In one embodiment, the ninth time domain resource is later than the sixth time domain resource in time.

In some possible embodiments, the ninth time domain resource is determined based on the third scheduling information; and the method further includes: receiving, by the terminal device, the third scheduling information, and determining the ninth time domain resource based on the third scheduling information.

In one embodiment, the terminal device determines the ninth time domain resource based on the third scheduling information; and the method further includes: determining, by the terminal device, the ninth time domain resource based on a receiving time of the third scheduling information and time indication information in the third scheduling information.

In one embodiment, the terminal device determines the ninth time domain resource based on the third scheduling information; and the method further includes: determining, by the terminal device, the ninth time domain resource based on a receiving time of the third scheduling information and scheduling and uplink transmission time interval information configured for the higher layer signaling.

In one embodiment, the terminal device determines the ninth time domain resource based on the third scheduling information; and the method further includes: determining, by the terminal device, the ninth time domain resource based on a receiving time of the third scheduling information and pre-defined scheduling and uplink transmission time interval information.

In one embodiment, the pre-defined scheduling and uplink transmission time interval information may be v time domain resources, where v is an integer greater than or equal to 0. v may be the same as u and h or different from u or h.

In one embodiment, the seventh time domain resource is within a time period from an end moment of the fourth time domain resource to a start moment of the third time domain resource, and the seventh time domain resource is later than the fourth time domain resource and earlier than the third time domain resource.

In one embodiment, the third HARQ process and the second HARQ process are consecutive HARQ processes. For example, a process number of the second HARQ process is 1, and then a process number of the third HARQ process is 2.

In one embodiment, the method further includes: clearing, by the terminal device, buffer data corresponding to the first HARQ process when timing of a first HARQ process timer reaches a valid time threshold of the process, where the valid time threshold of the process is configured or preset for the higher layer signaling.

If a HARQ process timer expires, data corresponding to the HARQ process timer is invalid, thereby reducing power consumption of the terminal device.

In one embodiment, the first HARQ process timer starts timing from the first request information.

The terminal device may select a timing start point of a HARQ process timer. For example, for the first HARQ process timer, the terminal device may select a start moment of the first time domain resource for sending the first request information as a timing start point, or a start moment of receiving the first scheduling information as a timing start point.

According to an eleventh aspect, a signal transmission method is provided. The method includes: receiving, by a network device, first request information on a first time domain resource; receiving, by the network device, a first transport block on at least one second time domain resource, where the first transport block corresponds to a first HARQ process, the at least one second time domain resource is within a first time period, the first time period is a time period from an end moment of the first time domain resource to a start moment of an $i^{th}$ time domain resource before a third time domain resource, the third time domain resource is determined based on first scheduling information, the first scheduling information is scheduling information that is of the first transport block and that is sent to a terminal device after the first request information is received, the first time period corresponds to a first HARQ process, and i is an integer greater than or equal to 0; and receiving, by the network device, the first transport block on the third time domain resource.

The network device receives the first request information on the first time domain resource, and receives the first transport block on at least one third time domain resource, where the at least one second time domain resource is within the first time period, the first time period is the time period from the end moment of the first time domain resource to the start moment of the $i^{th}$ time domain resource before the third time domain resource, the third time domain resource is determined based on the first scheduling information, the first scheduling information is the scheduling information that is of the first transport block and that is sent to the terminal device after the first request information is received, and the first time period corresponds to the first HARQ process. By determining that the first time period corresponds to the first HARQ process, the terminal device can send the first transport block of the same process on both the second time domain resource for grant free transmission and the third time domain resource for grant based transmission, so that the network device performs combined receiving, thereby improving accuracy of receiving the first transport block.

In one embodiment, the first time period may be a time period from the end moment of the first time domain resource to an end moment of the $i^{th}$ time domain resource before the third time domain resource, may be a time period from a start moment of the first time domain resource to an end moment of the $i^{th}$ time domain resource before the third time domain resource, or may be a time period from a start moment of the first time domain resource to the start moment of the $i^{th}$ time domain resource before the third time domain resource.

In one embodiment, the third time domain resource is determined based on the first scheduling information; and the method further includes: sending, by the network device, the first scheduling information.

In one embodiment, the method further includes: receiving, by the network device, second request information on a fourth time domain resource; receiving, by the network device, a second transport block on at least one fifth time domain resource, where a second time period is a time period from the end moment of the $i^{th}$ time domain resource before the third time domain resource to a start moment of a $j^{th}$ time domain resource before a sixth time domain resource, the sixth time domain resource is determined based on third scheduling information, the third scheduling information is scheduling information that is of the second transport block and that is received by the terminal device after the first scheduling information is received, the second time period corresponds to a second HARQ process, and j is an integer greater than or equal to 0; and receiving, by the network device, the second transport block on the sixth time domain resource.

In one embodiment, the second time period may be a time period from the end moment of the $i^{th}$ time domain resource before the third time domain resource to an end moment of the $j^{th}$ time domain resource before the sixth time domain resource, may be a time period from the start moment of the $i^{th}$ time domain resource before the third time domain resource to the end moment of the $j^{th}$ time domain resource before the sixth time domain resource, or may be a time period from the start moment of the $i^{th}$ time domain resource before the third time domain resource to the start moment of the $j^{th}$ time domain resource before the sixth time domain resource.

In one embodiment, the sixth time domain resource is determined based on the second scheduling information; and the method further includes: sending, by the network device, the second scheduling information.

In one embodiment, the method further includes: receiving, by the network device, third request information on a seventh time domain resource; receiving, by the network device, a third transport block on at least one eighth time domain resource, where a third time period is a time period from the end moment of the $j^{th}$ time domain resource before the sixth time domain resource to a start moment of a $k^{th}$ time domain resource before a ninth time domain resource, the ninth time domain resource is determined based on the third scheduling information, the third scheduling information is scheduling information that is of the third transport block and that is received by the terminal device after the second scheduling information is received, the third time period corresponds to a third HARQ process, and k is an integer greater than or equal to 0; and receiving, by the network device, the third transport block on the ninth time domain resource.

The third request information is used to request a resource for sending the third transport block.

The network device may further receive the third request information on the seventh time domain resource, and the network device can receive the third transport block on the at least one an eighth time domain resource.

The third time period may be a time period from the end moment of the $j^{th}$ time domain resource before the sixth time domain resource to an end moment of the $k^{th}$ time domain resource before the ninth time domain resource, may be a time period from the start moment of the $j^{th}$ time domain resource before the sixth time domain resource to the end moment of the $k^{th}$ time domain resource before the ninth time domain resource, or may be a time period from the start moment of the $j^{th}$ time domain resource before the sixth time domain resource to the start moment of the $k^{th}$ time domain resource before the ninth time domain resource.

In one embodiment, the method further includes: the seventh time domain resource is within a time period from an end moment of the fourth time domain resource to a start moment of the third time domain resource. To be specific, the seventh time domain resource is later than the second time domain resource and earlier than the fourth time domain resource.

In one embodiment, the ninth time domain resource is determined based on the third scheduling information; and the method further includes: sending, by the network device, the third scheduling information.

According to a twelfth aspect, a terminal device is provided. The terminal device includes a module configured to perform the method according to the tenth aspect or any possible implementation of the tenth aspect.

According to a thirteenth aspect, a network device is provided. The terminal device includes a module configured to perform the method according to the tenth aspect or any possible implementation of the tenth aspect.

According to a fourteenth aspect, a system is provided. The system includes:
 the terminal device according to the twelfth aspect and the network device according to the thirteenth aspect.

According to a fifteenth aspect, a terminal device is provided. The terminal device includes: a processor, a memory, and a communications interface. The processor is connected to the memory and the communications interface. The memory is configured to store an instruction; the processor is configured to execute the instruction; and the communications interface is configured to communicate with another network element under control of the processor. When the processor executes the instruction stored in the memory, the execution enables the processor to perform the method according to the tenth aspect or any possible implementation of the tenth aspect.

According to a sixteenth aspect, a network device is provided. The network device includes: a processor, a memory, and a communications interface. The processor is connected to the memory and the communications interface. The memory is configured to store an instruction; the processor is configured to execute the instruction; and the communications interface is configured to communicate with another network element under control of the processor. When the processor executes the instruction stored in the memory, the execution enables the processor to perform the method according to the eleventh aspect or any possible implementation of the eleventh aspect.

According to a seventeenth aspect, a computer storage medium is provided. The computer storage medium stores program code, and the program code is used to indicate an instruction for performing the method according to the tenth aspect or any possible implementation of the tenth aspect.

According to an eighteenth aspect, a computer storage medium is provided. The computer storage medium stores program code, and the program code is used to indicate an instruction for performing the method according to the eleventh aspect or any possible implementation of the eleventh aspect.

Based on the foregoing technical solutions, the terminal device determines the first time domain resource configured for the first channel, and adds the cyclic redundancy check CRC to the buffer status report, where the buffer status report to which the CRC is added is carried on the second channel; and then sends the second channel on the first time domain resource, or sends the first channel and the second channel on the first time domain resource. In this way, the terminal device independently adds the first CRC to the buffer status report, and sends the second channel carrying the buffer status report to the network device, so that the network device learns the arrival of the data corresponding to the second channel at the terminal device, and can learn, independent of successfully demodulating the first channel, the data corresponding to the buffer status report carried on the second channel. Therefore, the network device can preconfigure the resource for the data, thereby reducing the transmission latency of the data.

DESCRIPTION OF EMBODIMENTS

Figure 1:
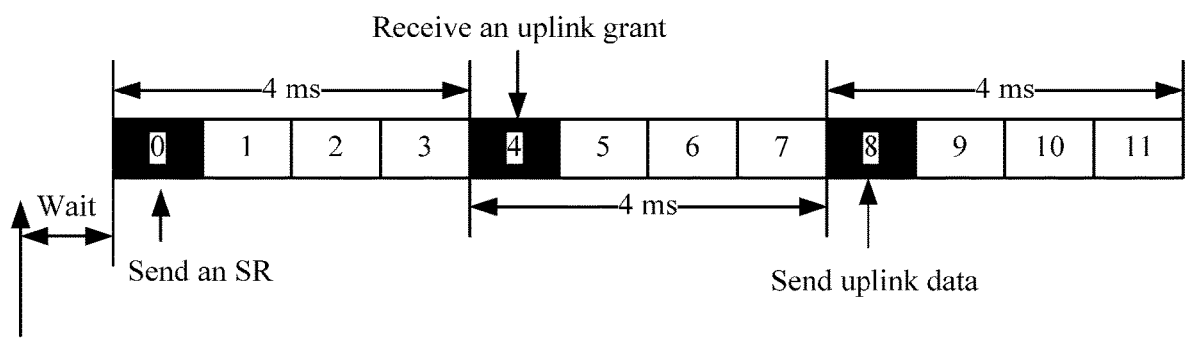
FIG. 1 is a schematic diagram of transmitting a data channel in a conventional solution.

The following describes technical solutions of this application with reference to accompanying drawings.

Through division based on access standards, technical solutions of embodiments of this application may be applied to various communications systems such as global system for mobile communications (GSM), a code division multiple access (CDMA) system, wideband code division multiple access (WCDMA), general packet radio service (GPRS), long term evolution (LTE), an LTE frequency division duplex (FDD) system, LTE time division duplex (TDD), universal mobile telecommunications system (UMTS), a wireless cellular network system, and a new radio communications system (NR). In embodiments of this application, description is made by using an LTE system and an NR system as an example, but this is not limited in this application.

It should be further understood that, in the embodiments of this application, user equipment (UE) may be referred to as a terminal, a mobile station (MS), a mobile terminal, or the like. The user equipment may communicate with one or more core networks through a radio access network (RAN). The UE may be referred to as an access terminal, a terminal device, a subscriber unit, a subscriber station, a mobile station, a mobile console, a remote station, a remote terminal, a mobile device, a user terminal, a terminal, a wireless communications device, a user agent, or a user apparatus.

The UE may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, or a terminal device in a future 5G network.

Resources used in the embodiments of this application may include a grant based resource, and may also include a grant free resource. Alternatively, in the embodiments of this application, communications devices (for example, a network device or a terminal device) in a communications system may use a resource based on a grant free transmission solution to perform communication, or may use a resource based on a scheduling manner to perform communication. This is not particularly limited in the embodiments of this application.

Grant based transmission may be: A resource used by the terminal device to transmit data and/or control information needs to be allocated and notified by the network device to the terminal device.

To be specific, in the embodiments of this application, data transmission may be scheduled based on a base station, and a basic time unit of scheduling is one or more time resources. A time length of the time resource may be one or more symbols, may be one or more symbol groups, may be one or more mini-slots, may be one or more slots, or may be one or more subframes. The symbol may be a symbol of a frequency domain in which one subcarrier is located and that is 15 kHz, or may be a symbol of a communications system of a frequency domain in which one subcarrier is located and that is greater than 15 kHz. The slot may be a slot of a frequency domain in which one subcarrier is located and that is 15 kHz, or may be a slot of a communications system of a frequency domain in which one subcarrier is located and that is greater than 15 kHz, and a length of the slot may be less than 0.5 ms. The mini-slot may be a mini-slot of a frequency domain in which one subcarrier is located and that is 60 kHz, or may be a slot of another communications system of a frequency domain in which one subcarrier is located, and a length of the mini-slot may be less than that of the slot. The subframe may be a subframe of a frequency domain in which one subcarrier is located and that is 15 kHz, or may be a subframe of a communications system of a frequency domain in which one subcarrier is located and that is greater than 15 kHz, and a length of the subframe may be less than 1 ms. This is not limited in the embodiments. For example, a frequency domain in which one subcarrier is located and that is greater than 15 kHz may be 30 kHz, 60 kHz, or 120 kHz. This is not limited in the embodiments.

One time domain resource is one or more time resources.

One frequency domain resource may be one or more subcarriers, may be one or more short physical resource blocks (SPRB), may be one or more short physical resource block groups (SRBG), may be one or more short virtual resource blocks (SVRB), or may be one or more subcarrier groups. An SPRB and an SVRB are respectively basic units of resource allocation that have different meanings. The SPRB is y consecutive subcarriers in frequency domain and is a resource of one transmission time length in time domain, the transmission time length may be any quantity of symbols from 1 symbol to x symbols, and x and y are positive integers. During centralized resource allocation, a definition of the SVRB is the same as that of the SPRB, and during distributed resource allocation, the SVRB and the SPRB have a particular correspondence. The SPRB is indexed as an SPRB index, and the SVRB is indexed as an SVRB index. Therefore, the SPRB index may be different from the SVRB index. An SRBG may include a plurality of SPRBs, and a quantity of the SPRBs included in the SRBG is determined based on a bandwidth of the terminal device or obtained based on an indication of the network device. The SPRB index may be a serial number of the SPRB, an SRBG index may be a serial number of the SRBG, the SVRB index may be a serial number of the SVRB, a subcarrier index may be a serial number of a subcarrier, and subcarrier group index may be a serial number of a subcarrier group. A subcarrier group includes at least one subcarrier, and herein a frequency domain in which one subcarrier is located may be equal to or greater than 15 kHz.

A specific scheduling process is: A base station sends a control channel, where the control channel may carry scheduling information of different downlink control information (DCI) formats, and the scheduling information includes control information such as resource allocation information and a modulation and coding scheme. The terminal device detects the control channel in one or more time resources, and receives a downlink data channel or sends an uplink data channel based on the scheduling information carried on the detected control channel.

A physical control channel may be a downlink physical control channel in an LTE system, or may be a physical channel carrying scheduling information or indication information.

Additionally, in recent years, researchers have proposed an uplink grant free transmission solution to a problem of an excessively long access time of a latency sensitive user, and the so-called Grant Free is a method in which user data uplink transmission can be implemented while the network device does not need to perform scheduling, thereby reducing time in an uplink access process.

In the embodiments of this application, grant free transmission may be understood as any one or more of the following meanings, a combination of some technical characteristics in a plurality of meanings, or another similar meaning:

The grant free transmission may be: The network device pre-allocates a plurality of transmission resources and informs the terminal device of the transmission resources; when having an uplink data transmission requirement, the terminal device selects at least one transmission resource from the plurality of transmission resources pre-allocated by the network device, and sends uplink data by using the selected transmission resource; and the network device detects, on the one or more transmission resources of the plurality of pre-allocated transmission resources, the uplink data sent by the terminal device. The detection may be blind detection, detection performed based on a control field in the uplink data, or detection performed in another manner.

The grant free transmission may be: The network device pre-allocates a plurality of transmission resources and informs the terminal device of the transmission resources, so that when having an uplink data transmission requirement, the terminal device selects at least one transmission resource from the plurality of transmission resources pre-allocated by the network device, and sends uplink data by using the selected transmission resource.

The grant free transmission may be: Information about a plurality of pre-allocated transmission resources is obtained, and when there is an uplink data transmission requirement, at least one transmission resource is selected from the plurality of transmission resources, and uplink data is sent by using the selected transmission resource. An obtaining manner may be: obtaining from the network device or pre-definition.

The grant free transmission may be: A method in which uplink data transmission of the terminal device can be implemented while the network device does not need to perform dynamic scheduling, where the dynamic scheduling may be a scheduling manner in which the network device indicates a transmission resource for each uplink data transmission of the terminal device based on signaling. Optionally, the implementation of the uplink data transmission of the terminal device may be understood as allowing uplink data transmission to be performed on data of two or more terminal devices on a same time frequency resource. Optionally, the transmission resource may be a transmission resource of one or more time domain resources after a moment at which the terminal device receives the signaling. One time domain resource may be a minimum time unit of single transmission such as a transmission time interval (TTI) whose value may be 1 ms, 0.5 ms, or 2 symbols, or may be another preset transmission time unit.

The grant free transmission may be: The terminal device performs uplink data transmission without granting from the network device. The granting may be: The terminal device sends an uplink scheduling request to the network device, and after receiving the scheduling request, the network device sends an uplink grant to the terminal device, where the uplink grant indicates an uplink transmission resource allocated to the terminal device.

The grant free transmission may be: a contention-based transmission manner, and may specifically mean that a plurality of terminals simultaneously perform uplink data transmission on a same pre-allocated time frequency resource, while a base station does not need to perform granting.

The data may include service data or signaling data.

In the embodiments of this application, the network device may be a network device (BTS) in GSM, may be a NodeB (NB) in WCDMA, may be an evolved NodeB (ENB or e-NodeB) in LTE, or may be a new generation NodeB (gNodeB). This is not limited in the embodiments of this application. However, for ease of description, description is made by using an ENB as an example in the following embodiment.

A time domain in a long term evolution-advanced (LTE-A) system is identified by using a radio frame, each radio frame includes 10 subframes having a length of 1 millisecond (ms), and each subframe includes two slots. For a normal cyclic prefix (normal CP), each slot includes seven symbols. For an extended cyclic prefix, each slot includes six symbols. A resource element is a symbol in time, and is a subcarrier in frequency. An uplink symbol is referred to as a single carrier frequency division multiple access (SC-FDMA) symbol, and a downlink symbol is referred to as an orthogonal frequency division multiplexing (OFDM) symbol.

It should be noted that, if an uplink multiple access manner of orthogonal frequency division multiple access (OFDMA) is introduced in a subsequent technology, the uplink symbol may also be referred to as an OFDM symbol. In the embodiments of this application, each of the uplink symbol and the downlink symbol may be briefly referred to as a "symbol". Data packets whose transmission time intervals (TTI) are reduced to a value between one symbol to 0.5 ms are collectively referred to as sTTI data packets, or data packets whose TTIs are not greater than 1 ms are referred to as sTTI data packets.

In a new radio (NR) system, a slot includes a plurality of OFDM symbols or SC-FDMA symbols, but a length of the slot depends on different subcarrier intervals. For example, if a subcarrier interval is 15 kHz, the length of the slot is 0.5 ms; or if a subcarrier interval is greater than 15 kHz, the slot is less than 0.5 ms. The NR system may include a plurality of different subcarrier intervals, and one subcarrier interval is referred to as one numerology. If numerologies are different, time lengths of a symbol are different.

The fifth generation mobile NR system has a plurality of different service types, and the plurality of service types respectively correspond to different service requirements. For example, ultra-reliable and low latency communications (URLLC) requires a low latency and high reliability, that is, successful transmission in 1 ms, enhanced mobile broadband (eMBB) has a spectral efficiency requirement but has no latency requirement, and massive machine type communications (mMTC) requires periodicity and transmission at low power.

A buffer status report may be a buffer status report (BSR) in LTE, may be a buffer status report of one or more hybrid automatic repeat request (HARQ) processes, or may be a buffer status report of a terminal device of a new radio NR access system, for example, a gBSR (generation Buffer Status Report). Alternatively, when content of information includes at least one of at least one logical channel identifier (LCD ID), at least one logical channel group identifier, and at least one buffer size, the information is considered as a buffer status report.

Higher layer signaling may be: signaling sent by a high protocol layer, where the high protocol layer is at least one of all protocol layers above a physical layer. The high protocol layer may be specifically at least one of the following protocol layers: a media access control (MAC) layer, a radio link control (RLC) layer, a packet data convergence protocol (PDCP) layer, a radio resource control (RRC) layer, a non-access stratum (NAS) layer, and the like.

CRC bits designed in this application may be 8 n bits, where n is a positive integer greater than or equal to 1 and is not limited in this application, for example, 8 bits, 16 bits, 24 bits, 32 bits, or 48 bits.

FIG. 1 is a schematic diagram of sending, by UE, an uplink data channel. As shown in FIG. 1, in an LTE-A system, a process from time when a terminal device (UE) has no grant based resource to time when the terminal device sends an uplink data channel include the following steps:

(1) The UE waits until time of sending a scheduling request (SR), such as a wait time period shown in FIG. 1.

(2) The UE sends the SR in a time period No. 0, and waits in time periods No. 1, No. 2, and No. 3 before the network device receives the SR. Herein, for ease of description, time periods may be numbered, and a length of a time period corresponding to each number is 1 ms.

(3) The eNB receives the SR, generates scheduling information, and sends the scheduling information to the UE. As shown in FIG. 1, the UE receives the scheduling information in a time period No. 4. When generating the scheduling information, the eNB does not learn a data volume that the UE actually intends to send.

(4) The UE makes, in time periods No. 5, No. 6, and No. 7, preparations to transmit the data channel, for example, packet assembly and encoding.

(5) The UE sends the uplink data channel in a time period No. 8, and adds BSR information of the UE to the uplink data channel. The base station needs to successfully demodulate the uplink data channel before the base station can obtain a BSR. Then, a data status of the UE is learned based on the BSR. For example, if there is no to-be-sent data, the base station further sends at least a piece of scheduling information to instruct the UE to send remaining data, until the UE has no uplink data to be transmitted.

Figure 2:
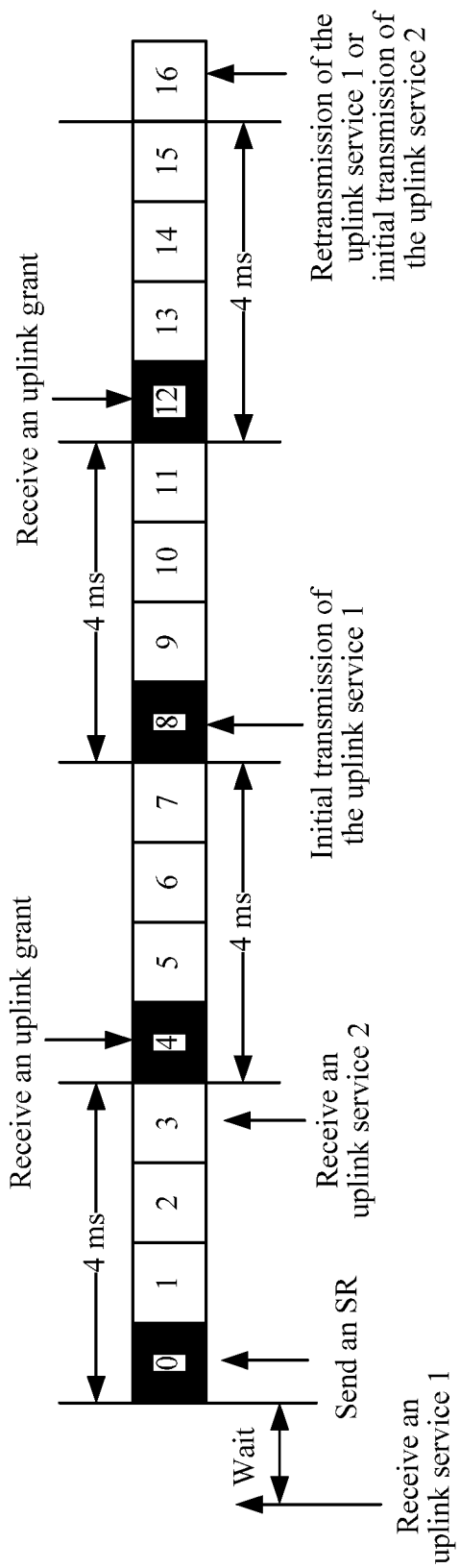
FIG. 2 is a schematic diagram of transmitting a plurality of data channels in a conventional solution.

FIG. 2 is a schematic diagram of transmitting a data channel in a conventional solution. As shown in FIG. 2, between time when first uplink data applies for a resource and a first uplink data channel, if UE has learned arrival of second uplink data, the UE may add BSR information to the first uplink data channel, where the BSR information is used to inform a network device that the UE still has data that needs to be sent.

CRC addition and encoding are performed together on a BSR and data. Therefore, the network device can learn a BSR of the second uplink data only after the network device successfully demodulates the first uplink data channel. As a result, a transmission latency of the second uplink data is affected by whether the first uplink data channel is successfully demodulated. In addition, if the network device incorrectly demodulates the first uplink data channel, the first uplink data channel needs to be retransmitted. Therefore, before the second uplink data can be transferred, the second uplink data needs to wait until the first uplink data channel is retransmitted and is successfully demodulated. As a result, the transmission latency of the second uplink data is relatively high. It should be understood that, because CRC addition and encoding are performed together on the BSR and the data, demodulation performance of the BSR is affected by the data. Therefore, it is quite difficult to use a conventional solution to satisfy a URLLC service that requires correct transmission within a short time.

Figure 3:
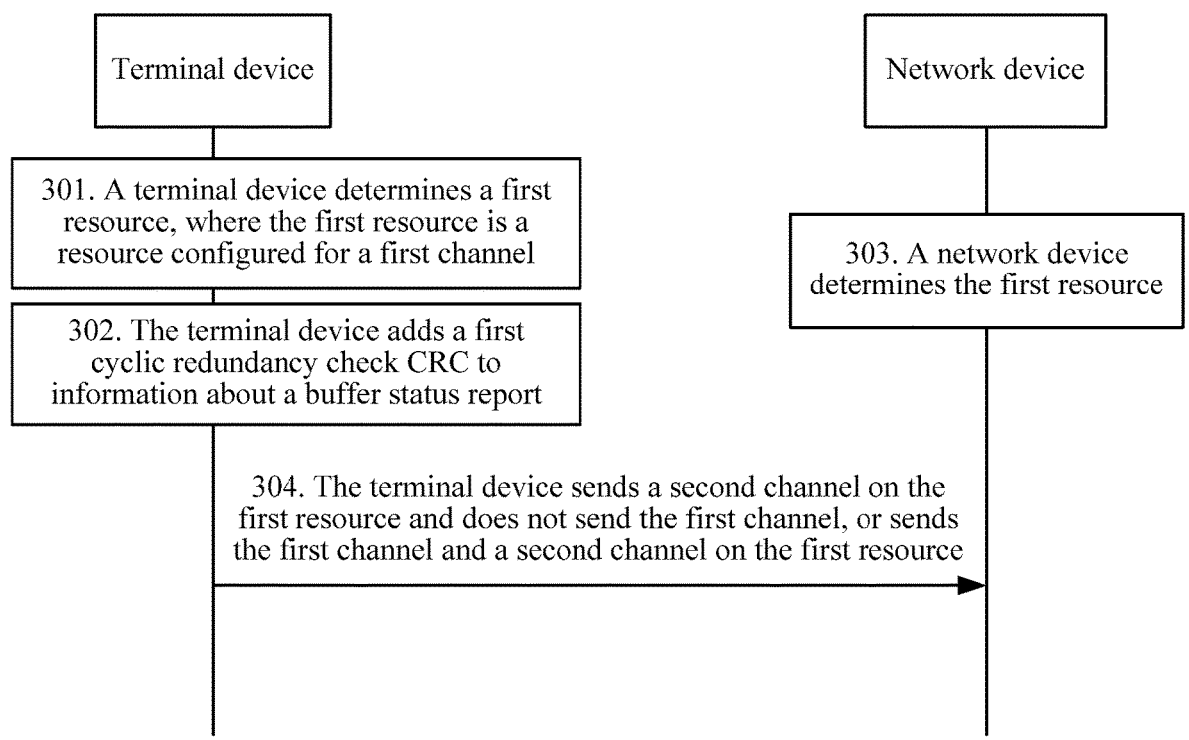
FIG. 3 is a schematic flowchart of a buffer status report sending method according to an embodiment of this application.

FIG. 3 is a schematic flowchart of a buffer status report sending method according to an embodiment of this application. As shown in FIG. 3, the method includes the following operations.

Operation 301. A terminal device determines a first resource, where the first resource is a resource configured for a first channel, and the first channel is a data channel.

In one embodiment, the terminal device determines the first resource, and the first resource may be a resource configured by a base station or the terminal device for the first channel, or may be a resource pre-defined by the terminal device and a base station. The first resource includes a first time domain resource and/or a first frequency domain resource.

In one embodiment, the first channel is an uplink data channel, the uplink data channel carries data and/or control information, the control information may be uplink control information (UCI), and the uplink control information may include at least one of the following: channel state information (CSI), a hybrid automatic repeat request (HARQ), a rank indicator (RI), a precoding matrix indicator (PMI), a channel quality indicator (CQI), and the like.

It should be understood that a buffer status report is to-be-transmitted data status information in a buffer of the terminal device of which the terminal device informs a network device, so that the network device may determine, based on the buffer status report, a quantity of resources for scheduling the terminal device, a priority, or the like. The buffer status report may be a buffer status report (BSR) in LTE, may be a buffer status report of one or more HARQ processes, or may be a buffer status report (generation Buffer Status Report, gBSR) of a new radio access system. It should be understood that the buffer status report includes at least one of at least one logical channel identifier, at least one logical channel group identifier, and at least one buffer size, but this application is not limited thereto for content included in the buffer status report.

In one embodiment, the terminal device receives first scheduling information, and the first scheduling information indicates the first resource for sending the first channel. In this way, the terminal device may determine the first resource based on the first scheduling information, and send a second channel by using the first resource, or send the first channel and a second channel on the first resource, thereby reducing a transmission latency of data corresponding to a buffer status report carried on the second channel.

It should be understood that the terminal device may alternatively determine the first resource based on physical layer signaling, or may alternatively determine the first resource based on indication information, where the first resource is a resource for grant based transmission. This is not limited in this application.

It should be noted that the first scheduling information may be sent by the network device to respond to a scheduling request (SR) sent by the terminal device, or may be sent by the network device to respond to a buffer status report sent by the terminal device. This is not limited in this application.

It should be understood that the first scheduling information may alternatively be control information, including some scheduling or control information such as a precoding matrix indicator (PMI), resource block assignment (RBA), and a modulation and coding scheme (MCS). This is not limited in this application.

In one embodiment, the terminal device receives higher layer signaling, where the higher layer signaling includes the first resource for sending the first channel, and the first resource is a grant free transmission resource. In this way, the terminal device may determine the first resource based on the higher layer signaling, and send the second channel by using the first resource, or send the first channel and the second channel on the first resource, thereby reducing the transmission latency of the data corresponding to the buffer status report carried on the second channel.

In one embodiment, the first resource may be a pre-defined resource.

Operation 302. The terminal device adds a first cyclic redundancy check CRC) to a buffer status report.

In one embodiment, the terminal device obtains, by adding the first CRC to the buffer status report, the buffer status report to which the first CRC is added, and the buffer status report to which the first CRC is added is carried on the second channel.

In one embodiment, before sending the buffer status report, the terminal device adds the first CRC to to-be-transmitted original bit information in the buffer status report, and then generates the buffer status report to which the first CRC is added. Further, the terminal device may further perform one or a combination of more than one of: code block segmentation, code block CRC addition, channel coding, rate matching, code block concatenation, channel interleaving, and the like on the buffer status report to which the first CRC is added, thereby generating the second channel. The first CRC may be generated by performing scrambling by using a terminal device identifier (UE-ID) of the terminal device or a cell-radio network temporary identifier (C-RNTI). In this way, the network device may identify that the second channel is sent by the terminal device. In addition, the buffer status report carried on the second channel may include at least one piece of the following information: at least one logical channel identifier, at least one logical channel group identifier, and at least one buffer size.

Operation 303. The network device determines the first resource.

In one embodiment, the first resource includes a plurality of resource elements. The first resource is a resource configured for the first channel, and may be pre-defined, determined based on the higher layer signaling, or determined based on the first scheduling information or the first indication information in physical layer signaling. The step of determining, by the network device, the first resource is optional. When the first resource is pre-defined, the network device does not need to determine the first resource, and directly receives the second channel on the first resource.

It should be understood that, when the first resource is a pre-defined resource, step 303 may not exist. When the first resource is configured for the physical layer signaling or the higher layer signaling, the network device may perform step 303, or may directly use the first resource and does not need to determine the first resource. This is not limited in the present invention.

Operation 304. The terminal device sends a second channel on the first resource, or sends the first channel and a second channel on the first resource, where the second channel is used to carry the buffer status report to which the first CRC is added. Correspondingly, the network device receives the second channel on the first resource, or receives the first channel and the second channel on the first resource.

In one embodiment, before the sending, by the terminal device, the first channel and the second channel on the first resource, the method includes: adding, by the terminal device, a second CRC to a first transport block, where the first channel is used to carry the first transport block to which the second CRC is added.

In one embodiment, before sending the first channel and the second channel on the first resource, the terminal device respectively adds CRCs to the first transport block carried on the first channel and the buffer status report carried on the second channel. For example, if the first transport block is A bits, and the second CRC occupies C bits, a size of the first transport block to which the second CRC is added is A+C bits. For example, if the buffer status report is B bits, and the first CRC occupies D bits, a size of a transport block to which the first CRC is added is B+D bits. Specifically, the terminal device adds the first CRC to the buffer status report, thereby generating the second channel; and adds the second CRC to the first transport block, thereby generating the first channel. The first channel and the second channel are two independent channels, and are separately generated by the terminal device. It should be understood that the network device separately receives, demodulates, and decodes the first channel and the second channel, other than demodulating and decoding the first channel and the second channel together. To be specific, the first channel includes only the first transport block and the added CRC and does not carry the buffer status report. Alternatively, it may be understood that the second channel includes only the buffer status report to which the first CRC is added and does not carry the first transport block. A, B, C, and D are integers greater than or equal to 0.

It should be further understood that the first transport block is a basic unit carrying at least data information and/or control information, the data information and/or control information may be included in one transport block (or a plurality of transport blocks), and any transport block conforming to this characteristic may be used as the first transport block. The first transport block is not limited in this application.

In one embodiment, the terminal device may further perform one or a combination of more than one of: code block segmentation, code block CRC addition, channel coding, rate matching, code block concatenation, channel interleaving, and the like on the first transport block to which the second CRC is added, thereby generating the first channel.

In one embodiment, after the adding, by the terminal device, a second CRC to a first transport block, the method further includes: dividing, by the terminal device, the first transport block to which the second CRC is added into at least two code blocks; and adding, by the terminal device, a third CRC to each of the at least two code blocks.

After adding the second CRC to the first transport block, the terminal device may further perform code block segmentation on the first transport block to which the second CRC is added. When a size of the first transport block is less than or equal to an encoding threshold of an encoder, and one code block is obtained through code block segmentation, the third CRC is not added, or a length of the added third CRC is 0; or when a size of the first transport block is greater than the encoding threshold of the encoder, because the first transport block is relatively large, at least two code blocks may be obtained after code block segmentation is performed, and the third CRC is added to each code block obtained after the segmentation. The encoding threshold of the encoder may be notified by the network device based on higher layer signaling or may be pre-defined.

It should be understood that third CRCs added to all code blocks obtained after the segmentation may be the same or different. This is not limited in this application.

It should be further understood that the third CRC added to each code block obtained after the segmentation may be the first CRC, the second CRC, or another CRC. This is not limited in this application.

It should be further understood that the first CRC may be the same as or different from the second CRC. This is not limited in this application.

It should be noted that a CRC may alternatively be added to the buffer status report in a manner of adding a CRC to the transport block carried on the first channel, and when code block segmentation is performed, there may still be only one code block or there may be at least two code blocks after the segmentation.

It should be noted that definitions of the second CRC and the third CRC that is added to each code block are similar to that of the first CRC, and details are not described herein again.

In one embodiment, when both the first channel and the second channel are transmitted on the first resource, the terminal device may send only the second channel on the first resource and does not send the first channel, or the terminal device sends both the first channel and the second channel on the first resource. To be specific, the network device may pre-learn, through the second channel, that the terminal device has a requirement of transmitting second uplink data corresponding to the buffer status report carried on the second channel, and can learn, independent of successfully demodulating the first channel, the second uplink data corresponding to the buffer status report carried on the second channel, thereby pre-configuring a resource for the second uplink data, and reducing a transmission latency of the second uplink data.

In one embodiment, the data and/or control information carried on the first channel corresponds to a first HARQ process, and the buffer status report carried on the second channel includes at least a buffer status report of a second HARQ process. To be specific, in addition to the buffer status report of the second HARQ process, BSR information carried on the second channel may further include buffer status reports of a plurality of other HARQ processes.

In one embodiment, the data and/or control information carried on the first channel may include a first logical channel group, and the buffer status report carried on the second channel includes at least a buffer status report of a second logical channel group.

In one embodiment, the data and/or control information carried on the first channel may further include a first service, and the buffer status report carried on the second channel includes at least a buffer status report of a second service.

A service may be a service type such as a URLLC service or an eMBB service. A service may alternatively be a service requirement such as a URLLC service required by the first service or a URLLC service required by the second service.

In one embodiment, the sending the second channel may be sending the second channel and skipping sending the first channel.

In one embodiment, the buffer status report carried on the second channel may include a buffer status report corresponding to an ultra-reliable and low latency communications URLLC service. Further, only when the buffer status report carried on the second channel includes the buffer status report corresponding to the URLLC service, the terminal device adds the first CRC to the buffer status report in the foregoing manner to generate the second channel, and then sends both the first channel and the second channel, or sends the second channel and does not send the first channel. When the buffer status report carried on the second channel does not include the buffer status report corresponding to the URLLC service, the terminal device concatenates the data and/or control information that the first channel needs to carry and original information of the buffer status report based on the solution in the prior art, then performs CRC addition and encoding together, and then sends the first channel. It may be understood that, when the buffer status report carried on the second channel does not include the buffer status report corresponding to the URLLC service, the second data has a relatively low latency requirement or has no latency requirement. Therefore, the prior art may still be used, so as to improve use efficiency of system resources.

In one embodiment, the second channel is used to carry only the buffer status report.

In one embodiment, the terminal device does not send the first channel and may discard the first channel, or may not send the first channel on the first resource, and further, may send the first channel on another resource.

It should be understood that the first logical channel group may include only one logical channel or may include a plurality of logical channels. This is not limited in this application.

Optionally, the terminal device sends a first uplink reference signal on the first resource.

It should be understood that the terminal device may send the first channel including the first uplink reference signal, or may separately send the first channel and the first uplink reference signal, so that the network device detects, based on the first uplink reference signal, that the terminal device sends the first channel and does not send the second channel.

Optionally, the terminal device sends a second uplink reference signal on the first resource.

It should be understood that the terminal device may send the second channel including the second uplink reference signal, or may separately send the second channel and the second uplink reference signal, so that the network device detects, based on the second uplink reference signal, that the terminal device sends the second channel and does not send the first channel.

Optionally, the terminal device sends a third uplink reference signal on the first resource.

It should be understood that the terminal device may send the first channel and the second channel including the third uplink reference signal, or may separately send the first channel, the second channel, and the second uplink reference signal, so that the network device detects, based on the third uplink reference signal, that the terminal device sends the first channel and the second channel.

The first uplink reference signal, the second uplink reference signal, and the third uplink reference signal are different from each other. An uplink reference signal may be a demodulation reference signal (DMRS) used to demodulate an uplink channel, may be a sounding reference signal (SRS) used to measure an uplink channel, may be a preamble sequence Preamble, or the like. A DMRS used for uplink control channel demodulation is referred to as an uplink control channel DMRS, and a DMRS used for uplink data channel demodulation is referred to as an uplink data channel DMRS. That the uplink reference signals are different from each other may be at least one of the following: sequence cyclic shifts corresponding to the uplink reference signals are different, layer index values corresponding to the uplink reference signals are different, frequency domain locations corresponding to the uplink reference signals are different, and time domain locations corresponding to the uplink reference signals are different.

Figure 4:
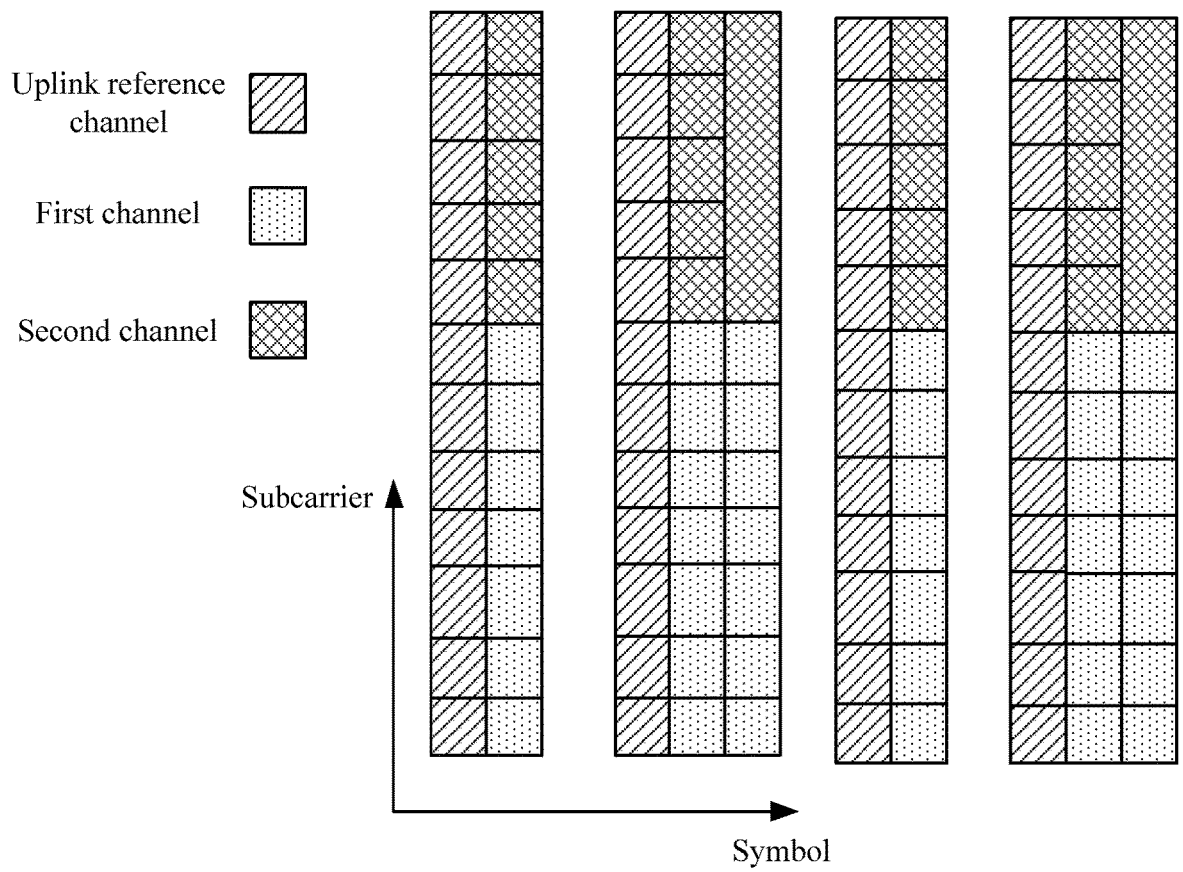
FIG. 4 is a structural diagram of a resource according to an embodiment of this application.

In one embodiment, if a first resource includes a plurality of resource elements, as shown in FIG. 4, sending, by a terminal device, a first channel and a second channel on the first resource may be sending the first channel on some of the plurality of resource elements, and sending the second channel on some other resource elements of the plurality of resource elements. In this way, a network device can accurately demodulate the first channel and the second channel.

The some other resource elements of the plurality of resource elements may be all resource elements other than the some of the plurality of resource elements occupied by the first channel, or may be some resource elements other than the some of the plurality of resource elements occupied by the first channel.

In one embodiment, the first resource includes at least one uplink reference signal. To be specific, the first channel and/or the second channel includes the at least one uplink reference signal. The at least one uplink reference signal further occupies some resource elements, at least one of the at least one uplink reference signal is used to demodulate the first channel, and at least one of the at least one uplink reference signal is used to demodulate the second channel. It should be noted that the reference signal used to demodulate the first channel may be the same as or different from the reference signal used to demodulate the second channel.

The at least one uplink reference signal includes at least one of a first uplink reference signal, a second uplink reference signal, and a third uplink reference signal. One uplink reference signal may occupy all resource elements on one or more symbols in the first resource, or may occupy some resource elements on one or more symbols in the first resource.

In one embodiment, the resource elements for sending the second channel are some or all resource elements in the first resource excluding the at least one uplink reference signal.

In one embodiment, for the some other resource elements of the plurality of resource elements occupied by the second channel, at least one of the following rules may be followed:

Rule 1: The resource elements for sending the second channel are some resource elements in the first resource excluding the resource elements occupied by the at least one uplink reference signal, and are mapped starting from a maximum resource frequency domain unit index of the first resource.

Rule 2: The resource elements for sending the second channel are some resource elements in the first resource excluding the resource elements occupied by the at least one uplink reference signal, and are mapped starting from a minimum resource frequency domain unit index of the first resource.

Rule 3: The resource elements for sending the second channel are some resource elements in the first resource excluding the at least one uplink reference signal, and are mapped to resource elements close to the resource elements occupied by the at least one uplink reference signal.

It should be noted that the plurality of resource elements may be divided in a puncturing manner or through rate matching. For example, the terminal device first maps the first channel on the plurality of resource elements, and when the terminal device further needs to send the second channel, the terminal device maps the second channel on some of the plurality of resource elements (the some resource elements are represented as a first part of resource elements corresponding to the foregoing some other resource elements of the plurality of resource elements). In this way, the terminal device sends the second channel on the first part of resource elements, and sends the first channel on resource elements of the plurality of resource elements other than the first part of resource elements; or when sending both the first channel and the second channel, the terminal device pre-allocates respective resource elements belonging to the first channel and the second channel, and separately sends the first channel and the second channel on the respective resource elements. The terminal device may determine, based on an original data volume of the buffer status report of the second channel, whether to choose to divide the resource elements in the puncturing manner or the rate matching manner. For example, when the original data volume of the buffer status report is a corresponding buffer status report including one logical channel or one logical channel group, the terminal device selects the puncturing manner. When the original data volume of the buffer status report is a corresponding buffer status report including more than one logical channel or one logical channel group, the terminal device selects the rate matching manner.

It should be understood that the resource elements include time domain resource elements and/or frequency domain resource elements.

In one embodiment, when both the first channel and the second channel of the terminal device are transmitted on the first resource, if the terminal device may determine that a quantity of resource elements occupied by the first channel is greater than or equal to a resource element threshold, or a ratio of a quantity of resource elements occupied by the first channel to a quantity of the plurality of resource elements is greater than or equal to a first resource element proportion threshold, or the transmit power of the first channel is greater than or equal to a second preset power threshold, the terminal device sends both the first channel and the second channel on the first resource.

In one embodiment, when both the first channel and the second channel of the terminal device are transmitted on the first resource, if the terminal device may determine that a quantity of resource elements occupied by the second channel is less than or equal to a second resource element quantity threshold, or a ratio of a quantity of resource elements occupied by the second channel to a quantity of the plurality of resource elements is less than or equal to a second resource element proportion threshold, or the transmit power of the second channel is less than or equal to a third preset power threshold, the terminal device sends both the first channel and the second channel on the first resource.

In one embodiment, when both the first channel and the second channel of the terminal device are transmitted on the first resource, if the terminal device may determine that a quantity of resource elements occupied by the first channel is less than or equal to a third resource element quantity threshold, or a ratio of a quantity of resource elements occupied by the first channel to a quantity of the plurality of resource elements is less than or equal to a third resource element proportion threshold, or the transmit power of the first channel is less than or equal to a fourth preset power threshold, the terminal device sends the second channel on the first resource.

In one embodiment, when both the first channel and the second channel of the terminal device are transmitted on the first resource, if the terminal device may determine that a quantity of resource elements occupied by the second channel is greater than or equal to a fourth resource element quantity threshold, or a ratio of a quantity of resource elements occupied by the second channel to a quantity of the plurality of resource elements is greater than or equal to a fourth resource element proportion threshold, or the transmit power of the second channel is greater than or equal to a fifth preset power threshold, and the terminal device sends the second channel on the first resource.

The first preset power threshold, the second preset power threshold, the third preset power threshold, the fourth preset power threshold, and the fifth preset power threshold may be pre-defined or configured for the higher layer signaling.

To be specific, if the second channel occupies an excessively large quantity of resource elements or the first channel occupies an excessively small quantity of resource elements, the base station cannot identify whether the terminal device sends the first channel. Therefore, to prevent subsequent retransmission of the first channel from being affected, the terminal device may abandon sending both the first channel and the second channel, and the terminal device may send only the second channel.

In one embodiment, the terminal device may determine, based on a priority of the first channel and a priority of the second channel, whether to send the first channel or the second channel on the first resource. When the priority of the first channel is lower than or equal to the priority of the second channel, the terminal device sends the second channel on the first resource. On the contrary, when the priority of the first channel is higher than the priority of the second channel, the terminal device sends the first channel on the first resource.

It should be noted that the priority of the first channel and the priority of the second channel may respectively correspond to a priority of the first service corresponding to the data and/or control information carried on the first channel and a priority of the second service included in the buffer status report carried on the second channel. If the first service and the second service are services of a same type, a priority order may be set to that the priority of the first channel carrying data is higher than or equal to that of the second channel carrying the buffer status report. If the first service corresponding to the data and/or control information carried on the first channel and the second service included in the buffer status report carried on the second channel are not services of a same type, other factors may be further considered for priority setting. For example, if the first service is an eMBB service, and the second service is a URLLC service, the priority of the first channel carrying the data is lower than the priority of the second channel carrying the buffer status report.

In one embodiment, in an embodiment, if a sum of the transmit power of the first channel and the transmit power of the second channel is less than or equal to the first preset power threshold, the terminal device sends the first channel and the second channel on the first resource; or if a sum of the transmit power of the first channel and the transmit power of the second channel is greater than the first preset power threshold, the terminal device sends the first channel or the second channel on the first resource.

It should be noted that the first preset power threshold may be determined based on configuration information, may be determined based on the higher layer signaling, or may be predetermined by the terminal device and the network device, or is a maximum transmit power that the terminal device can support, or the like. This is not limited in this application.

It should be understood that the transmit power of the first channel may be a transmit power of the first channel before transmit power compression, and the transmit power of the second channel may be a transmit power of the second channel before transmit power compression. To be specific, the terminal device calculates a power value of the first channel and a power value of the second channel based on a path loss and a transmit power control command, and the sum of the transmit power of the first channel and the transmit power of the second channel does not exceed the maximum transmit power allowed by the terminal device. Alternatively, the transmit power of the first channel may be a transmit power of the first channel after transmit power compression. To be specific, the sum of the power value of the first channel calculated by the terminal device based on the path loss and the transmit power control command and the power value of the second channel calculated by the terminal device based on the path loss and the transmit power control command exceeds the maximum transmit power allowed by the terminal device, and the transmit power of the first channel and the transmit power of the second channel are obtained after power compression is performed. It should be understood that a sum of the transmit power of the first channel after the power compression and the transmit power of the second channel after the power compression is less than or equal to the maximum transmit power allowed by the terminal device. This is not limited in this application.

In one embodiment, the network device detects the second channel on the first resource.

In one embodiment, the network device detects the first channel on the first resource.

In one embodiment, the network device detects the first channel and the second channel on the first resource.

In one embodiment, the network device may detect the first channel on some of the plurality of resource elements, the network device may detect the second channel on some other resource elements of the plurality of resource elements, or the network device may detect the second channel on all of the plurality of resource elements.

It should be understood that the network device may perform detection in one or a combination of more than one of the plurality of foregoing detection manners. This is not limited in this application.

The first resource includes at least one uplink reference signal. To be specific, the first channel and/or the second channel includes the at least one uplink reference signal. The at least one uplink reference signal further occupies some resource elements, at least one of the at least one uplink reference signal is used to demodulate the first channel, and at least one of the at least one uplink reference signal is used to demodulate the second channel. It should be noted that the reference signal used to demodulate the first channel may be the same as or different from the reference signal used to demodulate the second channel.

The at least one uplink reference signal includes at least one of a first uplink reference signal, a second uplink reference signal, and a third uplink reference signal. One uplink reference signal may occupy all resource elements on one or more symbols in the first resource, or may occupy some resource elements on one or more symbols in the first resource.

The some other resource elements of the plurality of resource elements may be all resource elements other than the some of the plurality of resource elements occupied by the first channel, or may be some resource elements other than the some of the plurality of resource elements occupied by the first channel.

In one embodiment, the resource elements for detecting the second channel are some or all resource elements in the first resource excluding the at least one uplink reference signal.

In one embodiment, for the some other resource elements of the plurality of resource elements occupied by the second channel, at least one of the following rules may be followed:

Rule 1: The resource elements for detecting the second channel are some resource elements in the first resource excluding the resource elements occupied by the at least one uplink reference signal, and are mapped starting from a maximum resource frequency domain unit index of the first resource.

Rule 2: The resource elements for detecting the second channel are some resource elements in the first resource excluding the resource elements occupied by the at least one uplink reference signal, and are mapped starting from a minimum resource frequency domain unit index of the first resource.

Rule 3: The resource elements for detecting the second channel are some resource elements in the first resource excluding the at least one uplink reference signal, and are mapped to resource elements close to the resource elements occupied by the at least one uplink reference signal.

In this way, when the network device is capable of sending both the first channel and the second channel, the network device may detect the second channel and receive the second channel, so that the network device can configure a resource for data corresponding to the second channel, thereby reducing a transmission latency of the data.

In one embodiment, the network device receives the second uplink reference signal on the first resource.

The network device may receive the second channel including the second uplink reference signal, or may separately receive the second channel and the second uplink reference signal, so that the network device detects the terminal device based on the second uplink reference signal and detects that the terminal device sends the second channel and does not send the first channel.

In one embodiment, the network device receives the third uplink reference signal on the first resource.

The network device may receive the first channel and the second channel including the third uplink reference signal, or may separately receive the first channel, the second channel, and the second uplink reference signal, so that the network device detects the terminal device based on the third uplink reference signal and detects that the terminal device sends the first channel and the second channel.

In one embodiment, the network device receives the first uplink reference signal on the first resource.

The network device may receive the first channel including the first uplink reference signal, or may separately receive the first channel and the first uplink reference signal, so that the network device detects the terminal device based on the first uplink reference signal and detects that the terminal device sends the first channel and does not send the second channel.

The first uplink reference signal, the second uplink reference signal, and the third uplink reference signal are different from each other. An uplink reference signal may be a demodulation reference signal (DMRS) used to demodulate an uplink channel, may be a sounding reference signal (SRS) used to measure an uplink channel, may be a preamble sequence Preamble, or the like. A DMRS used for uplink control channel demodulation is referred to as an uplink control channel DMRS, and a DMRS used for uplink data channel demodulation is referred to as an uplink data channel DMRS. That the uplink reference signals are different from each other may be at least one of the following: sequence cyclic shifts corresponding to the uplink reference signals are different, layer index values corresponding to the uplink reference signals are different, frequency domain locations corresponding to the uplink reference signals are different, and time domain locations corresponding to the uplink reference signals are different.

It should be further understood that step 304 may be performed before operation 303, or operation 304 and operation 303 are performed simultaneously, and a sequential order is not limited in this application.

It should be further understood that, even if step 301 to step 303 do not exist, step 304 may still exist alone.

In one embodiment, the network device receives the second channel on the first resource, and further receives the first channel on the first resource.

In one embodiment, the network device determines, based on the first CRC, whether the second channel is correctly received.

The network device compares the first CRC with a first CRC pre-stored in the terminal device on the network device side. If matching, it is considered that the second channel is correctly received; or if mismatching, it is considered that the second channel is incorrectly received. The network device may determine, based on the first CRC, whether the second channel is correctly received. If the second channel is incorrectly received, the network device may instruct the terminal device to retransmit the second channel or retransmit the buffer status report, thereby preventing the network device from incorrectly receiving the second channel, so as to improve data receiving reliability.

In one embodiment, the network device determines, based on the first CRC, a terminal device corresponding to the second channel.

The network device compares the first CRC with CRCs pre-stored in terminal devices on the network device side. If the first CRC matches a first CRC, it is considered that the second channel is sent by a first terminal device. If the first CRC matches a fourth CRC, it is considered that the second channel is sent by a second terminal device. The rest can be deduced by analogy, and details are not described. The network device determines, based on the first CRC, a terminal device that sends the second channel, thereby correctly and quickly identifying the terminal device, so that the network device demodulates the second channel without being affected by the first channel, and therefore can pre-learn arrival of data corresponding to a buffer status report of the corresponding terminal device, and then configure a resource for the data, thereby reducing a transmission latency of the data of the corresponding terminal device.

In one embodiment, the network device receives the second channel on the first resource, and further receives the first channel on the first resource.

In one embodiment, the network device determines, based on the second CRC, whether the first channel is correctly received.

The network device compares the second CRC with a second CRC pre-stored in the terminal device on the network device side. If matching, it is considered that the first channel is correctly received; or if mismatching, it is considered that the first channel is incorrectly received. The network device may determine, based on the second CRC, whether the first channel is correctly received. If the first channel is incorrectly received, the network device may instruct the terminal device to retransmit the first channel or retransmit the buffer status report, thereby preventing the network device from incorrectly receiving the first channel, so as to improve data receiving reliability.

In one embodiment, the network device determines, based on the third CRC, whether a code block carried on the first channel is correctly received.

In one embodiment, the network device determines, based on the second CRC, a terminal device corresponding to the first channel.

The network device compares the second CRC with CRCs pre-stored in terminal devices on the network device side. If the second CRC matches a second CRC, it is considered that the first channel is sent by a first terminal device. If the second CRC matches a fifth CRC, it is considered that the first channel is sent by a second terminal device. The rest can be deduced by analogy, and details are not described. The network device determines, based on the second CRC, a terminal device that sends the second channel, thereby correctly and quickly identifying the terminal device, so that the network device demodulates the second channel without being affected by the first channel, and therefore can pre-learn arrival of data corresponding to a buffer status report of the corresponding terminal device, and then configure a resource for the data, thereby reducing a transmission latency of the data of the corresponding terminal device.

In one embodiment, the terminal device may send first notification information to the network device, to notify the network device that the terminal device is capable of sending both the first channel and the second channel. In this way, when learning that the terminal device supports sending both the first channel and the second channel, the network device may choose to configure, for the terminal device, first configuration information for sending both the first channel and the second channel or to configure, for the terminal device, second configuration information for not sending both the first channel and the second channel, thereby reducing power consumption of the network device.

It should be understood that, when being incapable of sending both the first channel and the second channel, the terminal device may alternatively send a second notification information to the network device, to notify the network device that the terminal device is incapable of sending both the first channel and the second channel. In this way, the terminal device may determine, based on the priority of the first channel and the priority of the second channel, whether to send the first channel or the second channel on the first resource.

Optionally, after receiving the first notification information, the network device may send the first configuration information to the terminal device, and the terminal device determines, based on the first configuration information, that the terminal device can send both the first channel and the second channel.

In one embodiment, after receiving the first notification information, the network device may send the second configuration information to the terminal device, and the terminal device determines, based on the second configuration information, that the terminal device cannot send both the first channel and the second channel. It should be understood that, when the first channel and the second channel of the terminal device are transmitted on a same resource, the terminal device can send only the first channel or the second channel.

It should be understood that the first configuration information and the second configuration information may further include an uplink power, an uplink power priority, another uplink capability of the terminal device, or the like. This is not limited in this application.

In one embodiment, after receiving the second notification information, the network device may alternatively send the second configuration information to the terminal device, and the terminal device determines, based on the second configuration information, that the terminal device cannot send both the first channel and the second channel.

Therefore, based on the buffer status report sending method according to this embodiment of this application, the terminal device determines the first resource configured for the first channel, and adds the first CRC to the buffer status report, where the buffer status report to which the first CRC is added is carried on the second channel; and then sends the second channel on the first resource, or sends the first channel and the second channel on the first resource. In this way, the network device pre-learns that the terminal device has the data corresponding to the buffer status report carried on the second channel, and can learn, independent of successfully demodulating the first channel, the data corresponding to the buffer status report carried on the second channel, thereby pre-configuring a resource for the data, and reducing a transmission latency of the data.

Figure 5:
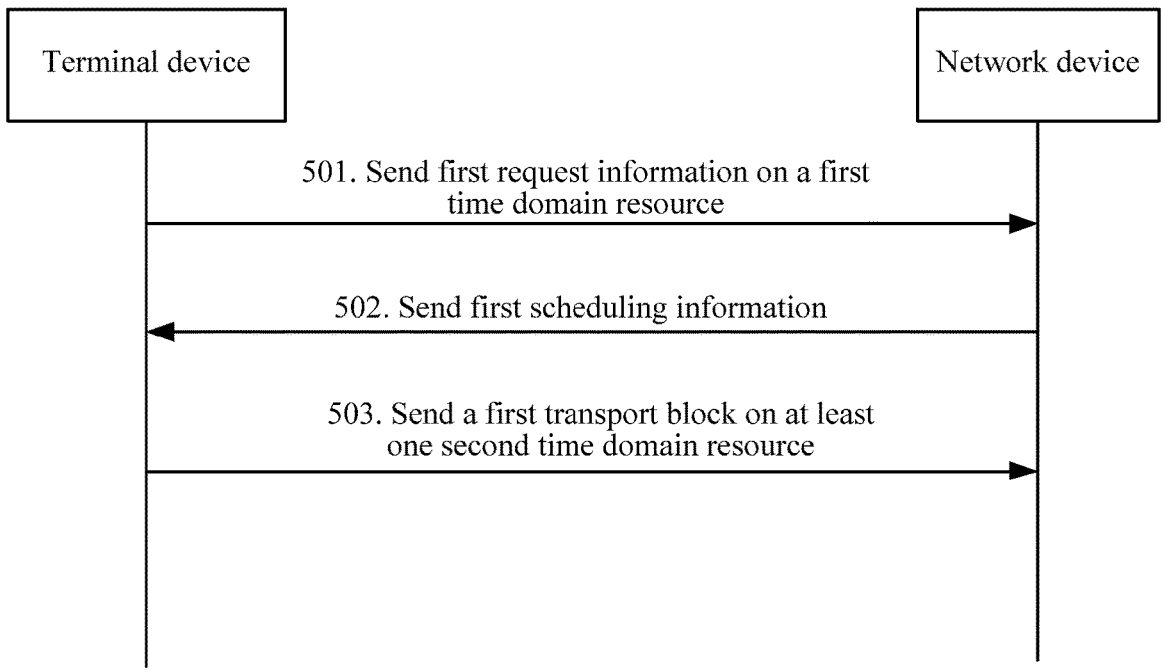
FIG. 5 is a schematic flowchart of a signal transmission method according to an embodiment of this application.

FIG. 5 is a schematic diagram of a signal transmission method according to an embodiment of this application. As shown in FIG. 5, the method includes the following operations.

Operation 501. A terminal device sends first request information on a first time domain resource. Correspondingly, a network device receives the first request information on the first time domain resource.

The time domain resource in this embodiment of this application may be a time domain resource using a subframe as a unit, may be a time domain resource using a slot as a unit, or may be a time domain resource using a symbol as a unit. This is not limited in this embodiment of this application.

In one embodiment, the first request information is used to request a time domain resource for sending a first transport block, and the first request information may be a scheduling request SR, may be an uplink reference signal, may be an uplink reference sequence, or may be a buffer status report. This is not limited in this application. A size of the first transport block may be carried on the request information or may be pre-defined. It should be understood that the size of the first transport block may alternatively be determined by the terminal device autonomously, but after receiving the first request information, the network device still does not determine the size of the first transport block. In this case, the network device considers that an allocated first resource may carry to-be-transmitted data of the terminal device. Usually, the first resource can carry the first transport block.

The first transport block may be all or some data in a buffer of the terminal device. Definitions of the first transport block, a second transport block, and a third transport block in this application are the same. Details are not described.

Operation 502. The network device sends first scheduling information to the terminal device, where the first scheduling information is used to instruct the terminal device to send the first transport block on a third time domain resource. Correspondingly, the terminal device receives the first scheduling information.

The first scheduling information is sent by the network device after receiving the first request information, and may be scheduling information determined based on the first request information, may be scheduling information responding to the first request information, or may be scheduling information not responding to the first request information.

In one embodiment, the first scheduling information may alternatively be control information, including some scheduling or control information such as a precoding matrix indicator (PMI), resource block assignment (RBA), and a modulation and coding scheme (MCS). This is not limited herein.

In one embodiment, the terminal device receives the first scheduling information, and determines the third time domain resource based on the first scheduling information.

In one embodiment, the terminal device determines the third time domain resource based on a receiving time of the first scheduling information and time indication information in the first scheduling information.

In one embodiment, the terminal device determines the third time domain resource based on a receiving time of the first scheduling information and scheduling and uplink transmission time interval information configured for higher layer signaling.

In one embodiment, the terminal device determines the third time domain resource based on a receiving time of the first scheduling information and pre-defined scheduling and uplink transmission time interval information.

In one embodiment, the terminal device sends second request information on a fourth time domain resource. Correspondingly, the network device sends the second request information on the fourth time domain resource.

In one embodiment, the fourth time domain resource is later than the first time domain resource, and the fourth time domain resource is earlier than the third time domain resource. To be specific, in this case, the terminal device can send at least two pieces of request information within a time period from a start moment of the first time domain resource to a start moment of the fourth time domain resource, thereby transmitting transport blocks of two processes.

In one embodiment, the second request information is used to request a time domain resource for sending a second transport block, and the second request information may be a scheduling request SR, may be a reference signal, may be a reference sequence, or may be a buffer status report. This is not limited in this application.

In one embodiment, the network device sends second scheduling information to the terminal device, where the second scheduling information is used to instruct the terminal device to send the second transport block on a sixth time domain resource. Correspondingly, the terminal device receives the second scheduling information.

In one embodiment, the second scheduling information may be sent by the network device after receiving the first request information, and may be further determined by the network device based on the second request information.

In one embodiment, the second scheduling information may alternatively be control information, including some scheduling or control information such as a precoding matrix indicator, resource block assignment and a modulation and coding scheme. This is not limited herein.

In one embodiment, the terminal device receives the second scheduling information, and determines the sixth time domain resource based on the second scheduling information.

In one embodiment, the terminal device determines the sixth time domain resource based on a receiving time of the second scheduling information and time indication information in the second scheduling information.

In one embodiment, the terminal device determines the sixth time domain resource based on a receiving time of the second scheduling information and scheduling and uplink transmission time interval information configured for higher layer signaling.

Optionally, the terminal device determines the sixth time domain resource based on a receiving time of the second scheduling information and pre-defined scheduling and uplink transmission time interval information.

In one embodiment, before the sending, by the terminal device, the first request information on the first time domain resource, the method further includes: determining, by the terminal device based on a quantity N of HARQ processes of the terminal device, a quantity M of request information that can be sent by the terminal device within a time period from the first time domain resource to the third time domain resource, where N is greater than or equal to 2, N and M are positive integers greater than or equal to 1, and N is greater than or equal to M.

It should be understood that a time period from the first time domain resource to an $i^{th}$ time domain resource before the third time domain resource may be a time period from the start moment of the first time domain resource to a start moment of the $i^{th}$ time domain resource before the third time domain resource, or may be a time period from the start moment of the first time domain resource to an end moment of the $i^{th}$ time domain resource before the third time domain resource.

It should be understood that the quantity of HARQ processes may be a maximum HARQ process quantity supported by the terminal device, may be a maximum HARQ process quantity configured by the network device for the terminal device based on the higher layer signaling, or may be a HARQ process quantity of the terminal device activated by the network device based on the higher layer signaling. This is not limited in this application.

Operation 503. The terminal device sends the first transport block on at least one second time domain resource, where the first transport block corresponds to a first hybrid automatic repeat request HARQ process, the at least one second time domain resource is within a first time period, the first time period is a time period from an end moment of the first time domain resource to a start moment of an $i^{th}$ time domain resource before a third time domain resource, the third time domain resource is determined based on first scheduling information, the first scheduling information is scheduling information that is of the first transport block and that is received by the terminal device after the first request information is sent, the first time period corresponds to the first HARQ process, and i is an integer greater than or equal to 0.

In one embodiment, the first time period may be a time period from the end moment of the first time domain resource to an end moment of the $i^{th}$ time domain resource before the third time domain resource, may be a time period from a start moment of the first time domain resource to an end moment of the $i^{th}$ time domain resource before the third time domain resource, or may be a time period from a start moment of the first time domain resource to the start moment of the $i^{th}$ time domain resource before the third time domain resource.

In one embodiment, there may be one or more first transport blocks.

In one embodiment, i may be notified by the network device based on the higher layer signaling, or i may be preset. For example, i=1, 2, or 3. It should be understood that, when i=0, the zeroth time domain resources before the third time domain resource is the third time domain resource.

In one embodiment, the terminal device determines the first time period based on the first time domain resource.

It should be noted that the terminal device may determine the first time period based on the first time domain resource after the first request information is sent or before the first transport block is sent on the at least one second time domain resource.

It should be noted that the network device may perform HARQ combined receiving based on the first transport block received on the at least one second time domain resource and a first transport block received on the third time domain resource, to further improve a signal-to-noise ratio, thereby improving receiving accuracy of the first transport block.

In one embodiment, the terminal device sends the second transport block on at least one fifth time domain resource, where the second transport block corresponds to a second HARQ process, the second HARQ process is different from the first HARQ process, the at least one fifth time domain resource is within a second time period, the second time period is a time period from the end moment of the $i^{th}$ time domain resource before the third time domain resource to a start moment of a $j^{th}$ time domain resource before a sixth time domain resource, the sixth time domain resource is determined based on second scheduling information, the second scheduling information is scheduling information that is of the second transport block and that is received by the terminal device after the first scheduling information is received, the second time period corresponds to the second HARQ process, and j is an integer greater than or equal to 0. Correspondingly, the network device receives the second transport block on the at least one fifth time domain resource.

In one embodiment, j may be notified by the network device based on the higher layer signaling, or j may be preset. For example, j=1, 2, or 3. i may be the same as or different from j. It should be understood that, when j=0, the $j^{th}$ time domain resource before the sixth time domain resource is the sixth time domain resource.

In one embodiment, the second time period is a time period from the end moment of the $i^{th}$ time domain resource before the third time domain resource to an end moment of the $j^{th}$ time domain resource before the sixth time domain resource, may be a time period from the start moment of the $i^{th}$ time domain resource before the third time domain resource to the end moment of the $j^{th}$ time domain resource before the sixth time domain resource, or may be a time period from the start moment of the $i^{th}$ time domain resource before the third time domain resource to the start moment of the $j^{th}$ time domain resource before the sixth time domain resource.

In one embodiment, the terminal device determines the second time period based on the $i^{th}$ time domain resource before the third time domain resource.

It should be understood that the terminal device may determine the second time period based on the $i^{th}$ time domain resource before the third time domain resource after the second request information is sent on the fourth time domain resource or before the terminal device sends the second transport block on the at least one fifth time domain resource.

In one embodiment, the terminal device sends third request information on a seventh time domain resource.

In one embodiment, after sending the second request information on the fourth time domain resource, the terminal device sends the third request information, where the third request information is used to request a resource for sending the third transport block.

In one embodiment, the terminal device sends the third transport block on at least one eighth time domain resource, where the third transport block corresponds to a third HARQ process, the at least one eighth time domain resource is within a third time period, the third time period is a time period from an end moment of the $j^{th}$ time domain resource before the sixth time domain resource to a start moment of a $k^{th}$ time domain resource before a ninth time domain resource, the ninth time domain resource is determined based on third scheduling information, the third scheduling information is scheduling information that is of the third transport block and that is received by the terminal device after the second scheduling information is received, the third time period corresponds to the third HARQ process, and k is an integer greater than or equal to 0.

In one embodiment, the third time period is a time period from the end moment of the $j^{th}$ time domain resource before the sixth time domain resource to an end moment of the $k^{th}$ time domain resource before the ninth time domain resource, may be a time period from the start moment of the $j^{th}$ time domain resource before the sixth time domain resource to the end moment of the $k^{th}$ time domain resource before the ninth time domain resource, or may be a time period from the start moment of the $j^{th}$ time domain resource before the sixth time domain resource to the start moment of the $k^{th}$ time domain resource before the ninth time domain resource.

In one embodiment, k may be notified by the network device based on the higher layer signaling, or k may be preset. For example, k=1. It should be understood that, when k=0, the $k^{th}$ time domain resource before the ninth time domain resource is the ninth time domain resource.

In one embodiment, the third scheduling information may alternatively be control information, including some scheduling or control information such as a precoding matrix indicator, resource block assignment, and a modulation and coding scheme.

In one embodiment, the seventh time domain resource is within a time period from an end moment of the fourth time domain resource to a start moment of the third time domain resource.

In one embodiment, the ninth time domain resource is later than the sixth time domain resource in time.

In one embodiment, the terminal device receives the third scheduling information, and determines the ninth time domain resource based on the third scheduling information.

In one embodiment, the terminal device determines the ninth time domain resource based on a receiving time of the third scheduling information and time indication information in the third scheduling information.

In one embodiment, the terminal device determines the ninth time domain resource based on a receiving time of the third scheduling information and scheduling and uplink transmission time interval information configured for the higher layer signaling.

In one embodiment, the terminal device determines the ninth time domain resource based on a receiving time of the third scheduling information and pre-defined scheduling and uplink transmission time interval information.

In one embodiment, the terminal device determines the third time period based on the $j^{th}$ time domain resource before the sixth time domain resource. It should be noted that the terminal device may determine the third time period based on the $j^{th}$ time domain resource before the sixth time domain resource after the terminal device sends the third request information on the seventh time domain resource or before the terminal device sends the third request information on the seventh time domain resource.

After sending the first request information on the first time domain resource, the terminal device may send $p^{th}$ request information based on a quantity N of HARQ processes of the terminal device, where N is greater than or equal to 2, and p=2, 3, . . . , or N, thereby transmitting transport blocks of the N processes.

In one embodiment, when the quantity N of HARQ processes of the terminal device is greater than 2, the terminal device may further send the third request information on the seventh time domain resource within the time period from the end moment of the fourth time domain resource to the start moment of the third time domain resource, where the seventh time domain resource is later than the fourth time domain resource and earlier than the third time domain resource.

It should be understood that the third request information herein may be the $p^{th}$ request information, where i=3, . . . , or N.

It should be further understood that, if the terminal device receives $q^{th}$ request information, and q is greater than an activated HARQ process quantity N, the terminal device cannot occupy a time domain resource within a time period from the start moment of the first time domain resource to the start moment of the third time domain resource to send the $q^{th}$ request information.

It should be understood that the at least one second time domain resource or the first time period does not include the fourth time domain resource, the fifth time domain resource, the sixth time domain resource, the seventh time domain resource, or the eighth time domain resource. Optionally, the at least one second time domain resource or the first time period further does not include the first time domain resource and/or the third time domain resource.

It should be understood that the at least one fifth time domain resource or the second time period does not include the second time domain resource, the third time domain resource, the seventh time domain resource, or the eighth time domain resource. Optionally, the at least one fifth time domain resource or the second time period further does not include the fourth time domain resource and/or the sixth time domain resource.

It should be understood that the at least one eighth time domain resource or the third time period does not include the second time domain resource, the third time domain resource, the fourth time domain resource, the fifth time domain resource, or the sixth time domain resource. Optionally, the at least one eighth time domain resource or the third time period further does not include the seventh time domain resource and/or the ninth time domain resource.

In one embodiment, as the time at which the terminal device receives the service corresponding to the second transport block differs, that is, the second request information sent by the terminal device differs, the first time period and the second time period also differ.

Figure 6:
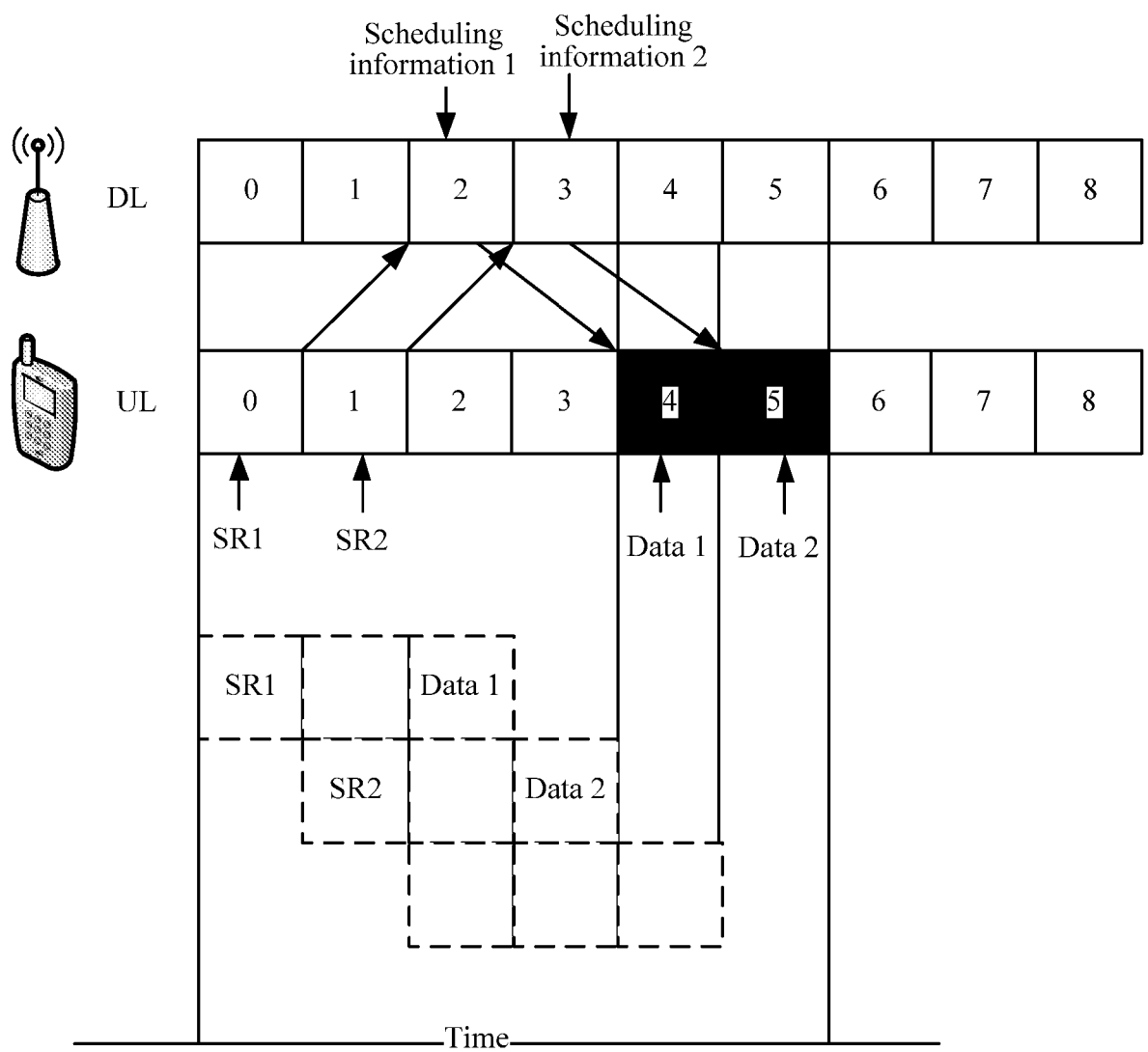
FIG. 6 is a schematic diagram of a multi-process data transmission method according to an embodiment of this application.

For example, as shown in FIG. 6, assuming that i=1, j=1, a time domain resource element is represented by using a slot. If the terminal device sends request information 1 on a slot 0 and sends request information 2 on a slot 1, the first scheduling information indicates that a slot 4 is used to send the first transport block, and the second scheduling information indicates that a slot 5 is used to send the second transport block, a slot 2 may be used to send the first transport block, that is, the slot 2 is the second time domain resource; and a slot 3 may be used to send the second transport block, that is, the slot 3 is the fifth time domain resource.

Figure 7:
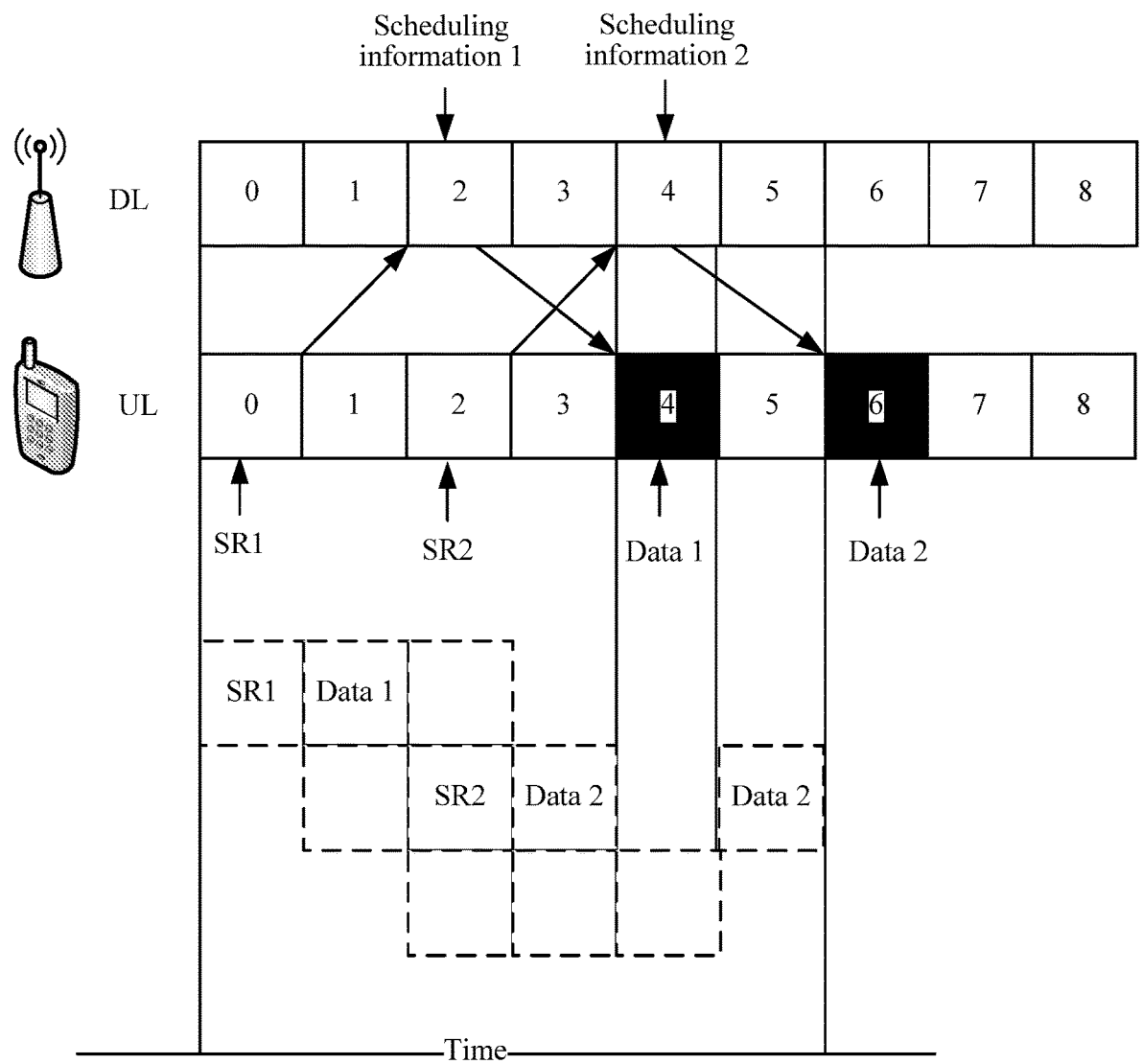
FIG. 7 is a schematic diagram of a multi-process data transmission method according to another embodiment of this application.

As shown in FIG. 7, assuming that i=1 and j=1, if the terminal device sends request information 1 on a slot 0 and sends request information 2 on a slot 2, the first scheduling information indicates that a slot 4 is used to send the first transport block, and the second scheduling information indicates that a slot 6 is used to send the second transport block, a slot 1 may be used to send the first transport block, and a slot 3 may be used to send the second transport block.

Figure 8:
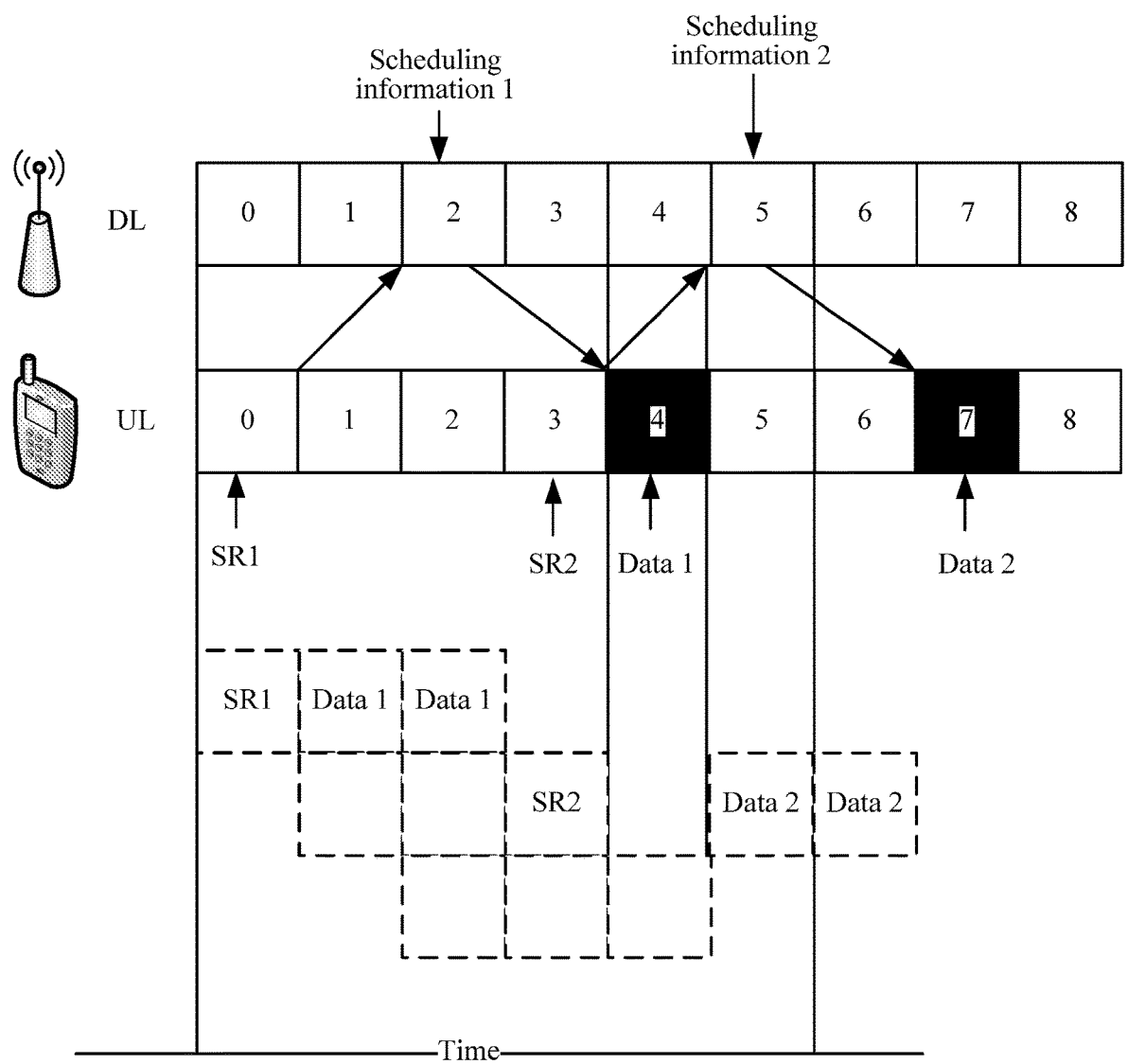
FIG. 8 is a schematic diagram of a multi-process data transmission method according to still another embodiment of this application.

As shown in FIG. 8, assuming that i=1 and j=1, if the terminal device sends request information 1 on a slot 0 and sends request information 3 on a slot 2, the first scheduling information indicates that a slot 4 is used to send the first transport block, and the second scheduling information indicates that a slot 7 is used to send the second transport block, a slot 1 and a slot 2 may be used to send the first transport block, and a slot 5 and a slot 6 may be used to send the second transport block.

It should be understood that, as the quantity of HARQ processes of the terminal device and a location for sending request information differ, the first time period and the second time period also differ.

In one embodiment, the terminal device may receive first configuration information, where the first configuration information is used to configure the quantity of HARQ processes of the terminal device.

In one embodiment, the terminal device may receive second configuration information, where the second configuration information is used to activate the quantity of HARQ processes of the terminal device.

In one embodiment, the terminal device may further set a HARQ process timer, and perform timing by using the HARQ process timer, and when the timing reaches a valid time threshold that is set in the HARQ process timer, the terminal device clears buffer data corresponding to the HARQ process.

In one embodiment, if the HARQ process timer expires, data corresponding to the HARQ process timer is also invalid. Therefore, the terminal device may discard the data, or may transfer the data to another HARQ process and send the data by a latency, thereby reducing power consumption of the terminal device.

It should be noted that the terminal device may set a HARQ process timer for each HARQ process of the terminal device. For example, when a first HARQ process timer reaches a first valid time threshold, the terminal device clears buffer data corresponding to the first HARQ process.

In one embodiment, the terminal device may select a timing start point of a HARQ process timer. For example, for the first HARQ process timer, the terminal device may select the start moment of the first time domain resource for sending the first request information as a timing start point, a start moment of receiving the first scheduling information as a timing start point, a moment at which the first transport block enters a first HARQ buffer as a timing start point, or a moment at which the first transport block is generated at a higher layer as a timing start point. This is not limited in this application.

It should be further understood that all or only some of operations 501 to 503 may exist, and the steps have no sequential order.

Therefore, based on the signal transmission method according to this embodiment of this application, the terminal device sends the first request information on the first time domain resource, and sends the first transport block on the at least one second time domain resource, where the at least one second time domain resource is within the first time period, the first time period is the time period from the end moment of the first time domain resource to the start moment of the $i^{th}$ time domain resource before the third time domain resource, the third time domain resource is determined based on the first scheduling information, the first scheduling information is the scheduling information that is of the first transport block and that is received by the terminal device after the first request information is sent, and the first time period corresponds to the first HARQ process; and the terminal device sends the first transport block on the third time domain resource. By determining that the first time period corresponds to the first HARQ process, the terminal device can send the first transport block of the same process on both the second time domain resource for grant free transmission and the third time domain resource for grant based transmission within the time period from the first time domain resource to the third time domain resource, so that the network device performs combined receiving, thereby improving accuracy of receiving the first transport block.

Figure 9:
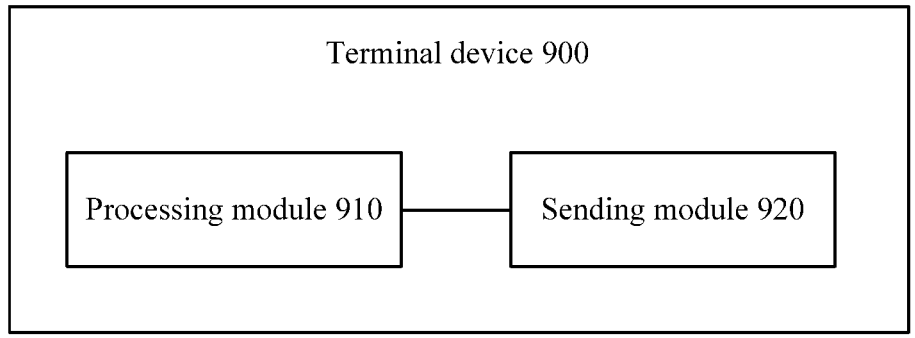
FIG. 9 is a schematic block diagram of a terminal device according to an embodiment of this application.

FIG. 9 is a schematic block diagram of a terminal device 900 according to an embodiment of this application. As shown in FIG. 9, the terminal device 900 includes:

a processing module 910, configured to determine a first resource, where the first resource is a resource configured for a first channel, and the first channel is a data channel, where the processing module 910 is further configured to add a first CRC to a buffer status report; and a sending module 920, configured to send a second channel on the first resource, or send the first channel and a second channel on the first resource, where the second channel is used to carry the buffer status report to which the first CRC is added.

Therefore, the terminal device according to this embodiment of this application determines the first resource configured for the first channel, and adds the first CRC to the buffer status report, where the buffer status report to which the first CRC is added is carried on the second channel; and then sends the second channel on the first resource, or sends the first channel and the second channel on the first resource. In this way, the terminal device independently adds the first CRC to the buffer status report, and sends the second channel carrying the buffer status report to a network device, so that the network device learns, through the second channel, arrival of data corresponding to the second channel at the terminal device, and can learn, independent of successfully demodulating the first channel, the data corresponding to the buffer status report carried on the second channel. Therefore, the network device can pre-configure a resource for the data, thereby reducing a transmission latency of the data.

In one embodiment, the processing module 910 is further configured to add a second CRC to a first transport block, where the first channel is used to carry the first transport block to which the second CRC is added.

In one embodiment, after the terminal device adds the second CRC to the first transport block, the processing module 910 is further configured to divide the first transport block to which the second CRC is added into at least two code blocks; and the processing module 910 is further configured to add a third CRC to each of the at least two code blocks.

In one embodiment, the sending module 920 is specifically configured to: send the first channel and the second channel on the first resource, where a sum of a transmit power of the first channel and a transmit power of the second channel is less than or equal to a first preset power threshold.

In one embodiment, the first resource includes a plurality of resource elements, and the sending module 920 is specifically configured to: send the first channel on some of the plurality of resource elements, and send the second channel on some other resource elements of the plurality of resource elements.

In one embodiment, the sending module 920 is specifically configured to: send the second channel on the first resource and skip sending the first channel, where a priority of the first channel is lower than or equal to a priority of the second channel.

In one embodiment, the terminal device 900 further includes: a receiving module, configured to receive first scheduling information, where the first scheduling information indicates the first resource, where the processing module 910 is specifically configured to: determine the first resource based on the first scheduling information.

In one embodiment, the terminal device 900 further includes: a receiving module, configured to receive higher layer signaling, where the higher layer signaling includes the first resource, where the processing module 910 is specifically configured to: determine the first resource based on the higher layer signaling.

Therefore, the terminal device according to this embodiment of this application determines the first resource configured for the first channel, and adds the first CRC to the buffer status report, where the buffer status report to which the first CRC is added is carried on the second channel; and then sends the second channel on the first resource, or sends the first channel and the second channel on the first resource. In this way, the terminal device independently adds the first CRC to the buffer status report, and sends the second channel carrying the buffer status report to a network device, so that the network device learns, through the second channel, arrival of data corresponding to the second channel at the terminal device, and can learn, independent of successfully demodulating the first channel, the data corresponding to the buffer status report carried on the second channel. Therefore, the network device can pre-configure a resource for the data, thereby reducing a transmission latency of the data.

It should be understood that the terminal device 900 according to this embodiment of this application may correspond to the terminal device in the data sending method 300 according to the embodiments of this application, and the foregoing and other management operations and/or functions of modules in the terminal device 900 are respectively used to implement corresponding steps of the foregoing methods. For brevity, details are not described herein again.

Figure 10:
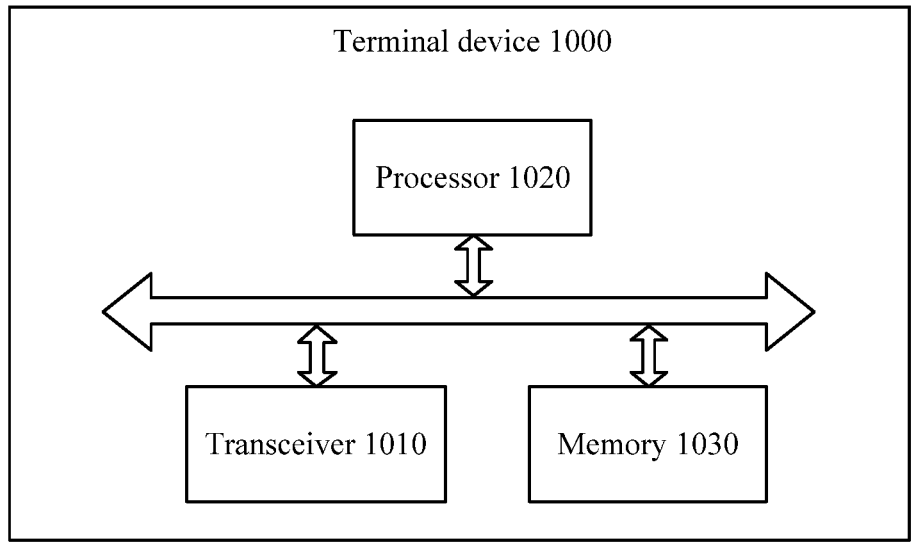
FIG. 10 is a schematic structural diagram of a terminal device according to an embodiment of this application.

The sending module 920 in this embodiment of this application may be implemented by a transceiver. The processing module 910 may be implemented by a processor. As shown in FIG. 10, a terminal device 1000 may include a transceiver 1010, a processor 1020, and a memory 1030. The memory 1030 may be configured to store indication information, and may be further configured to store code, an instruction, and the like executed by the processor 1020.

Figure 11:
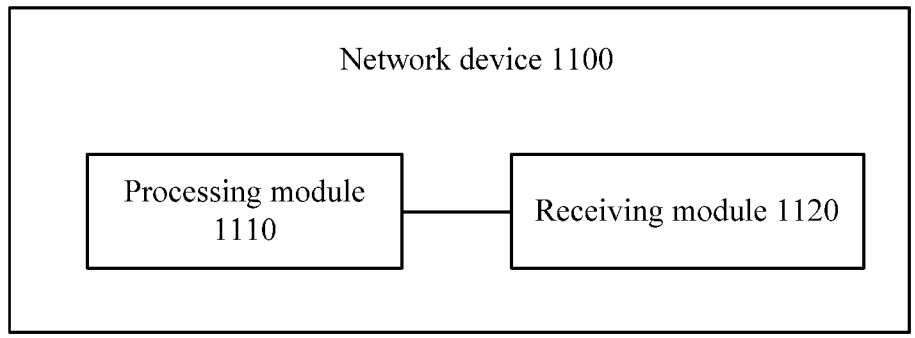
FIG. 11 is a schematic block diagram of a network device according to an embodiment of this application.

FIG. 11 is a schematic block diagram of a network device 1100 according to an embodiment of this application. As shown in FIG. 11, the network device 1100 includes:

a processing module 1110, configured to determine a first resource, where the first resource is a resource configured for a first channel, and the first channel is a data channel; and a receiving module 1120, configured to receive a second channel on the first resource, where the second channel is used to carry a buffer status report to which a first CRC is added.

Therefore, the network device according to this embodiment of this application receives the second channel on the first resource, where the first resource is a resource configured for the first channel, the second channel is used to carry the buffer status report to which the first CRC is added, the buffer status report to which the first CRC is added is obtained by adding, by a terminal device, the first CRC to the buffer status report; and receives the first channel and the second channel on the first resource or receives the second channel on the first resource. In this way, the network device receives the buffer status report carried on the second channel, and the network device learns, through the second channel, arrival of data corresponding to the second channel at the terminal device, and can learn, independent of successfully demodulating the first channel, the data corresponding to the buffer status report carried on the second channel, so that the network device can pre-configure a resource for the data, thereby reducing a transmission latency of the data.

In one embodiment, the processing module 1110 is specifically configured to: determine, based on the first CRC, whether the second channel is correctly received.

In one embodiment, the receiving module 1120 is specifically configured to:
receive the first channel and the second channel on the first resource, where the first channel is used to carry a first transport block to which a second CRC is added.

In one embodiment, the processing module 1110 is specifically configured to: determine, based on the second CRC, whether the first channel is correctly received.

In one embodiment, the receiving module 1120 is specifically configured to: receive the first channel and the second channel on the first resource, where the first transport block to which the second CRC is added includes at least two code blocks, and each of the at least two code blocks is a code block to which a third CRC is added.

In one embodiment, the first resource includes a plurality of resource elements, and the processing module 1110 is specifically configured to:
detect the first channel on some of the plurality of resource elements;
detect the second channel on some other resource elements of the plurality of resource elements; and
detect the second channel on all of the plurality of resource elements.

In one embodiment, the processing module 1110 is specifically configured to:
detect the first channel by using a first uplink reference signal; and/or
detect the second channel by using a second uplink reference signal.

In one embodiment, the first resource includes a plurality of resource elements, and the receiving module 1120 is specifically configured to:
receive, by the network device, the first channel on some of the plurality of resource elements, and receive the second channel on some other resource elements of the plurality of resource elements.

In one embodiment, the network device 1100 further includes:
a sending module, configured to send first scheduling information, where the first scheduling information indicates the first resource.

In one embodiment, the network device 1100 further includes:
a sending module, configured to send higher layer signaling, where the higher layer signaling includes the first resource.

Therefore, the network device according to this embodiment of this application receives the second channel on the first resource, where the first resource is a resource configured for the first channel, the second channel is used to carry the buffer status report to which the first CRC is added, the buffer status report to which the first CRC is added is obtained by adding, by a terminal device, the first CRC to the buffer status report; and receives the first channel and the second channel on the first resource or receives the second channel on the first resource. In this way, the network device receives the buffer status report carried on the second channel, and the network device learns, through the second channel, arrival of data corresponding to the second channel at the terminal device, and can learn, independent of successfully demodulating the first channel, the data corresponding to the buffer status report carried on the second channel, so that the network device can pre-configure a resource for the data, thereby reducing a transmission latency of the data.

It should be understood that the network device 1100 according to this embodiment of this application may correspond to the entity for performing the data sending method 300 according to the embodiments of this application, and the foregoing and other management operations and/or functions of modules in the network device 1100 are respectively used to implement corresponding steps of the foregoing methods. For brevity, details are not described herein again.

Figure 12:
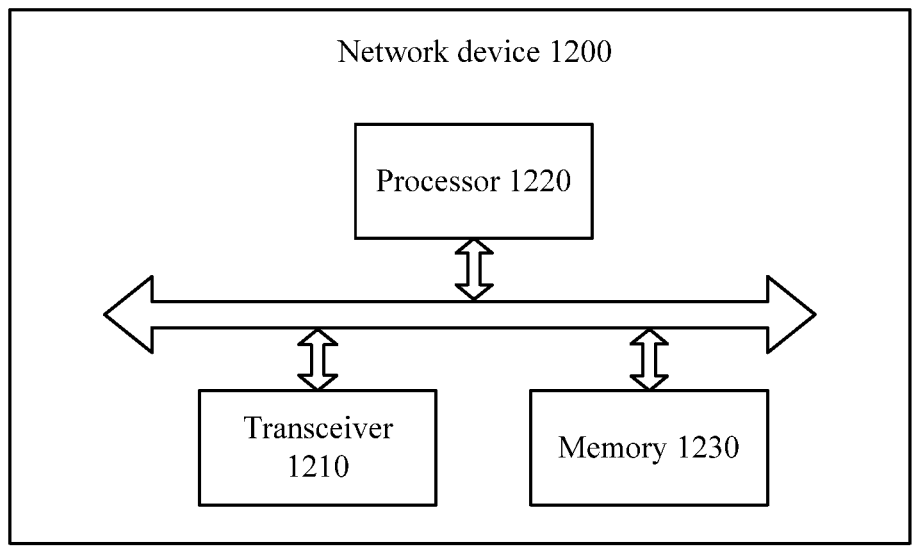
FIG. 12 is a schematic structural diagram of a network device according to an embodiment of this application.

The receiving module 1120 in this embodiment of this application may be implemented by a transceiver. The processing module 1110 may be implemented by a processor. As shown in FIG. 12, a network device 1200 may include a transceiver 1210, a processor 1220, and a memory 1230. The memory 1230 may be configured to store indication information, and may be further configured to store code, an instruction, and the like executed by the processor 1220.

Figure 13:
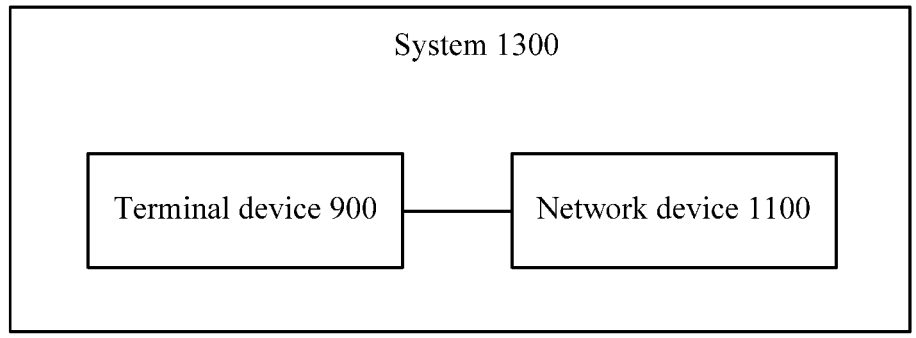
FIG. 13 is a schematic block diagram of a terminal device according to an embodiment of this application.

An embodiment of this application further provides a system. As shown in FIG. 13, the system 1300 includes:
the terminal device 900 according to the embodiments of this application and the network device 1100 according to the embodiments of this application.

An embodiment of this application further provides a computer storage medium. The computer storage medium may store a program instruction used to indicate any one of the foregoing methods.

In one embodiment, the storage medium may be specifically a memory 930 or 1130.

It should be understood that a processor 920 or a processor 1120 may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logical device, a discrete gate or transistor logic device, or a discrete hardware component. It may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory 930 or the memory 1130 in the embodiments of the present invention may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memory of the systems and methods described in this specification includes but is not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A buffer status report sending method, comprising:
   determining a first resource, wherein the first resource is a resource configured for a first channel, and the first channel is a data channel;
   adding a first cyclic redundancy check (CRC) to a buffer status report; and
   sending the first channel and a second channel on the first resource, wherein the second channel is used to carry the buffer status report to which the first CRC is added, wherein before the sending the first channel and the second channel on the first resource, adding a second CRC to a first transport block, wherein the first channel is used to carry the first transport block to which the second CRC is added, and after the adding the second CRC to the first transport block, dividing the first transport block to which the second CRC is added into at least two code blocks, and, adding a third CRC to each of the at least two code blocks.

2. The method according to claim 1, wherein the sending the first channel and the second channel on the first resource comprises:
   sending the first channel and the second channel on the first resource, wherein a sum of a transmit power of the first channel and a transmit power of the second channel is less than or equal to a first preset power threshold.

3. The method according to claim 1, wherein the first resource comprises a plurality of resource elements, and the sending the first channel and the second channel on the first resource comprises:
   sending the first channel on some of the plurality of resource elements, and sending the second channel on some other resource elements of the plurality of resource elements.

4. The method according to claim 1, wherein the sending a second channel on the first resource comprises:
   sending the second channel on the first resource and skipping sending the first channel, wherein a priority of the first channel is lower than or equal to a priority of the second channel.

5. An apparatus, comprising:
   a processor, configured to
      determine a first resource, wherein the first resource is a resource configured for a first channel, and the first channel is a data channel, and
      add a first cyclic redundancy check (CRC) to a buffer status report; and
   a transceiver, configured to send the first channel and a second channel on the first resource, wherein the second channel is used to carry the buffer status report to which the first CRC is added, wherein before the sending the first channel and the second channel on the first resource, the processor is further configured to add a second CRC to a first transport block, wherein the first channel is used to carry the first transport block to which the second CRC is added, and after the adding the second CRC to the first transport block, the processor is further configured to divide the first transport block to which the second CRC is added into at least two code blocks, and, add a third CRC to each of the at least two code blocks.

6. The apparatus according to claim 5, wherein the transceiver is configured to:
   send the first channel and the second channel on the first resource, wherein a sum of a transmit power of the first channel and a transmit power of the second channel is less than or equal to a first preset power threshold.

7. The apparatus according to claim 5, wherein the first resource comprises a plurality of resource elements, and the transceiver is configured to:
   send the first channel on some of the plurality of resource elements, and send the second channel on some other resource elements of the plurality of resource elements.

8. The apparatus according to claim 5, wherein the transceiver is configured to:
   send the second channel on the first resource and skip sending the first channel, wherein a priority of the first channel is lower than or equal to a priority of the second channel.

9. An apparatus, comprising:
   a processor, configured to determine a first resource, wherein the first resource is a resource configured for a first channel, and the first channel is a data channel; and
   a transceiver, configured to receive a second channel on the first resource, wherein the second channel is used to carry a buffer status report to which a first cyclic redundancy check (CRC) is added, receive the first channel and the second channel on the first resource, wherein the first channel is used to carry a first transport block to which a second CRC is added, wherein the processor is further configured to: determine, based on the first CRC, whether the second channel is correctly received, determine, based on the second CRC, whether the first channel is correctly received, wherein the transceiver is configured to: receive the first channel and the second channel on the first resource, wherein the first transport block to which the second CRC is added comprises at least two code blocks, and each of the at least two code blocks is a code block to which a third CRC is added.

10. The apparatus according to claim 9, wherein the first resource comprises a plurality of resource elements, and the processor is configured to:
    detect the first channel on some of the plurality of resource elements;
    detect the second channel on some other resource elements of the plurality of resource elements; and
    detect the second channel on all of the plurality of resource elements.

11. The apparatus according to claim 9, wherein the processor is configured to perform at least one of the following:
    detecting the first channel by using a first uplink reference signal; or
    detecting the second channel by using a second uplink reference signal.

12. The apparatus according to claim 9, wherein the first resource comprises a plurality of resource elements, and the transceiver is configured to:
    receive the first channel on some of the plurality of resource elements, and
    receive the second channel on some other resource elements of the plurality of resource elements.

* * * * *